(12) United States Patent
Huang et al.

(10) Patent No.: US 11,598,936 B2
(45) Date of Patent: Mar. 7, 2023

(54) OPTICAL IMAGING LENS ASSEMBLY

(71) Applicant: ZHEJIANG SUNNY OPTICAL CO., LTD, Zhejiang (CN)

(72) Inventors: Wenbo Huang, Zhejiang (CN); Lingbo He, Zhejiang (CN); Fujian Dai, Zhejiang (CN); Liefeng Zhao, Zhejiang (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 312 days.

(21) Appl. No.: 17/033,981

(22) Filed: Sep. 28, 2020

(65) Prior Publication Data

US 2021/0263276 A1  Aug. 26, 2021

(30) Foreign Application Priority Data

Feb. 26, 2020 (CN) .......................... 202010126251.X

(51) Int. Cl.
*G02B 13/00* (2006.01)
*G02B 9/64* (2006.01)
*G02B 27/00* (2006.01)

(52) U.S. Cl.
CPC .......... *G02B 13/0045* (2013.01); *G02B 9/64* (2013.01); *G02B 27/0025* (2013.01)

(58) Field of Classification Search
CPC ... G02B 13/0045; G02B 9/64; G02B 27/0025
USPC ......................................... 359/708, 751, 755
See application file for complete search history.

(56) References Cited

U.S. PATENT DOCUMENTS

2021/0055519 A1* 2/2021 Wei ...................... H04N 5/2253

FOREIGN PATENT DOCUMENTS

CN          110286476 A  *  9/2019  ......... G02B 13/0015

* cited by examiner

*Primary Examiner* — William Choi
(74) *Attorney, Agent, or Firm* — Gang Yu

(57) ABSTRACT

Some embodiments of the disclosure provide an optical imaging lens assembly. From an object side to an image side along an optical axis, the optical imaging lens assembly sequentially includes: a first lens having a refractive power; a second lens having a refractive power, and an object-side surface of the second lens is a convex surface, and an image-side surface of the second lens is a concave surface; a third lens having a refractive power; a fourth lens having a refractive power; a fifth lens having a refractive power; a sixth lens having a positive refractive power, an object-side surface of the sixth lens is a convex surface, and an image-side surface of the sixth lens is a convex surface; and a seventh lens having a negative refractive power, an object-side surface of the seventh lens is a concave surface, and an image-side surface is a concave surface.

19 Claims, 20 Drawing Sheets

OPTICAL IMAGING LENS ASSEMBLY

CROSS-REFERENCE TO RELATED APPLICATION(S)

The disclosure claims priority to Chinese Patent Application No. 202010126251.X, filed on Feb. 26, 2020 and entitled "Optical Imaging Lens Assembly", the disclosure of which is hereby incorporated by reference in its entirety.

TECHNICAL FIELD

The disclosure relates to a field of optical components, and more particularly, to an optical imaging lens assembly.

BACKGROUND

In recent years, with a development of scientific technologies, the requirements on optical imaging lens assemblies for portable electronic products on the market are gradually increased. Mobile phones and other portable devices are typically provided with a camera module and thus the mobile phones achieve a photographing function. The camera module is often provided with a Charge-coupled Device (CCD) image sensor or a Complementary Metal Oxide Semiconductor (CMOS) image sensor, and further provided with an optical imaging lens assembly. The optical imaging lens assembly can gather light rays on an object side, and an imaging light rays travel along an optical path of the optical imaging lens assembly and are irradiated onto the image sensor; and then, the image sensor converts an optical signal into an electrical signal to form an image data.

Along with the upgrade and update of consumption-type electronic products, development of image software functions and video software functions on the consumption-type electronic products, improvement in performances of the CCD and CMOS components and reduction in sizes, higher requirements on high imaging quality and miniaturization of the assorted optical imaging lens assembly are also pushed forward; and it is desirable that the optical imaging lens assembly can achieve more abundant optical performances and more flexible assembly performances.

In order to meet the imaging requirement and use requirement, an optical imaging lens assembly capable of considering high imaging quality and a large rear focal length is needed.

SUMMARY

Some embodiments of the disclosure provide an optical imaging lens assembly which can be applied to portable electronic products, and at least solve or partially solve at least one of the above shortcomings in an art known to inventors.

Some embodiments of the disclosure provide an optical imaging lens assembly, which includes a first lens, a second lens, a third lens, a fourth lens, a fifth lens, a sixth lens and a seventh lens which are provided in sequence from an object side to an image side along an optical axis, wherein the first lens has a refractive power; the second lens has a refractive power, wherein, an object-side surface of the second lens is a convex surface, and an image-side surface of the second surface is a concave surface; the third lens has a refractive power; the fourth lens has a refractive power; the fifth lens has a refractive power; the sixth lens has a positive refractive power, an object-side surface of the sixth lens is a convex surface, and an image-side surface of the sixth lens is a convex surface; and the seventh lens has a negative refractive power, an object-side surface of the seventh lens is a concave surface, and an image-side surface of the seventh lens is a concave surface, wherein a distance FFL on the optical axis between the image-side surface of the seventh lens and an imaging surface of the optical imaging lens assembly, and an axial distance TTL between an object-side surface of the first lens and the imaging surface satisfy FFL/TTL>0.3.

In some embodiments, at least one aspherical mirror surface is provided in the object-side surface of the first lens to the image-side surface of the seventh lens.

In some embodiments, a total effective focal length f of the optical imaging lens assembly satisfies 14.8 mm<f<17.3 mm.

In some embodiments, an effective focal length f6 of the sixth lens, a radius of curvature R11 of the object-side surface of the sixth lens and a radius of curvature R12 of the image-side surface of the sixth lens satisfy 5.5<f6/(R11+R12)<7.4.

In some embodiments, an effective focal length f7 of the seventh lens, a radius of curvature R13 of the object-side surface of the seventh lens and a radius of curvature R14 of the image-side surface of the seventh lens satisfy −1.7<f7/(R13+R14)<−1.2.

In some embodiments, a total effective focal length f of the optical imaging lens assembly, an effective focal length f1 of the first lens and an effective focal length f2 of the second lens satisfy 0.4<f/(f1−f2)<0.6.

In some embodiments, a maximum Field of View (FOV) of the optical imaging lens assembly satisfies 66°<FOV<76°.

In some embodiments, a radius of curvature R3 of the object-side surface of the second lens and a radius of curvature R4 of the image-side surface of the second lens satisfy 0.5<R4/R3<0.8.

In some embodiments, a spacing distance T23 on the optical axis between the second lens and the third lens, a central thickness CT3 of the third lens on the optical axis and a spacing distance T34 on the optical axis between the third lens and the fourth lens satisfy 0.6<(T23+CT3)/T34<1.1.

In some embodiments, a synthetic focal length f123 for the first lens, the second lens and the third lens and a synthetic focal length f4567 for the fourth lens, the fifth lens, the sixth lens and the seven lens satisfy 0.1<f123/f4567<0.9.

In some embodiments, an axial distance SAG21 from an intersection between the object-side surface of the second lens and the optical axis to an effective radius vertex of the object-side surface of the second lens, an axial distance SAG22 from an intersection between the image-side surface of the second lens and the optical axis to an effective radius vertex of the image-side surface of the second lens and a central thickness CT2 of the second lens on the optical axis satisfy 1.8<(SAG21+SAG22)/CT2<3.8.

In some embodiments, an axial distance SAG61 from an intersection between the object-side surface of the sixth lens and the optical axis to an effective radius vertex of the object-side surface of the sixth lens, an axial distance SAG62 from an intersection between the image-side surface of the sixth lens and the optical axis to an effective radius vertex of the image-side surface of the sixth lens, an axial distance SAG51 from an intersection between an object-side surface of the fifth lens and the optical axis to an effective radius vertex of the object-side surface of the fifth lens, and an axial distance SAG52 from an intersection between an image-side surface of the fifth lens and the optical axis to an effective radius vertex of the image-side surface of the fifth lens satisfy 0.2<(SAG61+SAG62)/(SAG51+SAG52)<0.7.

In some embodiments, a distance FFL on the optical axis between the image-side surface of the seventh lens and the imaging surface, and a distance TTL between an object-side surface of the first lens and the imaging surface meet 0.4<FFL/TTL<0.6.

Some embodiments of the disclosure further provide an optical imaging lens assembly, which includes from an object side to an image side along an optical axis: a first lens having a refractive power; a second lens having a refractive power, an object-side surface of the second lens is a convex surface, and an image-side surface of the second lens is a concave surface; a third lens having a refractive power; a fourth lens having a refractive power; a fifth lens having a refractive power; a sixth lens having a positive refractive power, an object-side surface of the sixth lens is a convex surface, and an image-side surface of the sixth lens is a convex surface; and a seventh lens having a negative refractive power, an object-side surface of the seventh lens is a concave surface, and an image-side surface of the seventh lens is a concave surface; and a synthetic focal length f123 for the first lens, the second lens and the third lens and a synthetic focal length f4567 for the fourth lens, the fifth lens, the sixth lens and the seven lens satisfy 0.1<f123/f4567<0.9.

According to some embodiments of the disclosure, with the adoption of seven lenses, and by reasonably distributing the refractive power and surface type of each lens, the central thickness of each lens, the axial distance of each lens, and the like, the optical imaging lens assembly has at least one beneficial effect of high imaging quality, large rear focal length, convenience in machining, easiness in assembly and flexible application, etc.

BRIEF DESCRIPTION OF THE DRAWINGS

Detailed descriptions are made to unrestrictive implementation modes below in combination with the drawings to make the other characteristics, purposes and advantages of the disclosure more apparent. In the accompanying drawings: In the drawings.

DETAILED DESCRIPTION OF THE EMBODIMENTS

Figure 1:
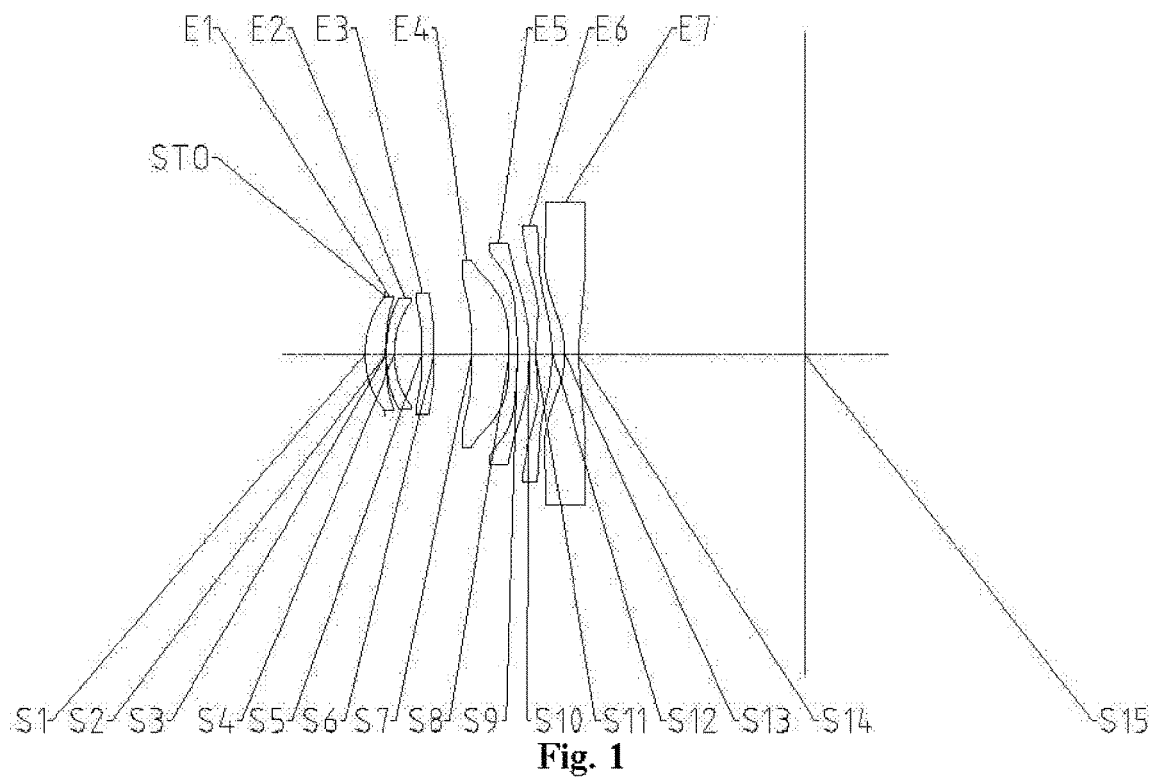
FIG. 1 is a structure diagram of an optical imaging lens assembly according to embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It is to be noted that, in the specification, expressions like first, second and third are adopted not to represent any limit to characteristics but only to distinguish one characteristic from another characteristic. Therefore, a first lens discussed below may also be called a second lens or a third lens under the condition of not departing from the teachings of the disclosure.

For convenient description, thicknesses, sizes and shapes of lenses are slightly magnified in the drawings. Specifically, spherical or aspherical shapes in the drawings are shown exemplarily. That is, spherical or aspherical shapes are not limited to the spherical or aspherical shapes shown in the drawings. The drawings are drawn only exemplarily but not strictly to scale.

In the disclosure, a paraxial region refers to a region nearby an optical axis. If a surface of a lens is a convex surface and a position of the convex surface is not defined, it is indicated that at least a paraxial region of the surface of the lens is a convex surface; and if a surface of a lens is a concave surface and a position of the concave surface is not defined, it is indicated that at least a paraxial region of the surface of the lens is a concave surface. A surface, closest to an object, in each lens is called an object-side surface, and a surface, closest to an imaging surface, in each lens is called an image-side surface.

It is also to be understood that terms "include", "including", "have", "contain" and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It is also to be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The characteristics, principles and other aspects of the disclosure will be described below in detail.

An optical imaging lens assembly according to some embodiments of the disclosure includes seven lenses with refractive power, i.e., a first lens, a second lens, a third lens, a fourth lens, a fifth lens, a sixth lens and a seventh lens. The seven lenses are disposed in sequence from an object side to an image side along an optical axis. Any two adjacent lenses in the first lens to the seventh lens have an air space between them.

In some embodiments, the first lens has the positive refractive power or negative refractive power; the second lens has the positive refractive power or negative refractive power, an object-side surface thereof is a convex surface, and an image-side surface is a concave surface; the third lens has the positive refractive power or negative refractive power; the fourth lens has the positive refractive power or negative refractive power; the fifth lens has the positive refractive power or negative refractive power; the sixth lens has the positive refractive power, an object-side surface thereof is a convex surface, and an image-side surface is a convex surface; and the seventh lens has the negative refractive power, an object-side surface thereof is a concave surface, and an image-side surface is a concave surface. By reasonably controlling the positive and negative distribution for the refractive power of each component of the lens and the curvature of a surface type of the lens, the low-order aberration of the lens is effectively balanced and controlled. When the object-side surface of the second lens is the convex surface and the image-side surface of the second lens is the concave surface, a balance is achieved between the off-axis aberration and the axial aberration; with the sixth lens which has the positive refractive power and is provided with the convex object-side surface and the convex image-side surface, light rays at an edge field are gathered; and with the seventh lens which has the negative refractive power and is provided with the concave object-side surface and the concave image-side surface, the field curvature and astigmatism of the optical imaging lens assembly are improved.

In some embodiments, the optical imaging lens assembly further includes at least one diaphragm. The diaphragm may be arranged at a proper position as required, for example, between the object side and the fourth lens. In some embodiments, the optical imaging lens assembly further includes an optical filter for correcting color deviation and/or protective glass for protecting a photosensitive element on the imaging surface.

In some embodiments, the optical imaging lens assembly of the disclosure satisfy the following relationship: FFL/ TTL>0.3, where, the FFL is a distance on the optical axis between the image-side surface of the seventh lens and the imaging surface of the optical imaging lens assembly, and the TTL is an axial distance on the optical axis between the object-side surface of the first lens and the imaging surface. By controlling a ratio of a rear focal length to a total optical length in the optical imaging lens assembly, an optical accessory can be placed in an image-side direction of the lens of the optical imaging lens assembly.

In some embodiments, the optical imaging lens assembly satisfies the following relationship: 0.4<FFL/TTL<0.6. By limiting the ratio of the rear focal length to the total optical length in the optical imaging lens assembly within a certain range, a prism is well placed behind the lens assembly.

In some embodiments of the disclosure, the optical imaging lens assembly satisfies the following relationship: 14.8 mm<f<17.3 mm, where, the f is a total effective focal length of the optical imaging lens assembly. In some embodiments, the f satisfies 14.90 mm<f<17.24 mm. By restricting the range of the total effective focal length of the optical imaging lens assembly, the optical imaging lens assembly obtains a larger depth of field and more rich imaging details.

In some embodiments of the disclosure, the optical imaging lens assembly satisfies 5.546/(R11+R12)<7.4, where, the f6 is an effective focal length of the sixth lens, the R11 is a radius of curvature of the object-side surface of the sixth lens, and the R12 is a radius of curvature of the image-side surface of the sixth lens. By limiting a ratio of the effective focal length of the sixth lens to a sum of the curvature radii of two mirror surfaces of the sixth lens within a certain range, the astigmatism of the optical imaging lens assembly is small, and the optical imaging lens assembly achieves good imaging quality.

In some embodiments of the disclosure, the optical imaging lens assembly satisfies −1.7<f7/(R13+R14)<−1.2, where, the f7 is an effective focal length of the seventh lens, the R13 being a radius of curvature of the object-side surface of the seventh lens, and the R14 is a radius of curvature of the image-side surface of the seventh lens. In some embodiments, the f7, the R13 and the R14 satisfy −1.63<f7/(R13+ R14)<−1.23. By limiting a ratio of the effective focal length of the seventh lens to a sum of the curvature radii of two mirror surfaces of the seventh lens within a certain range, the aberration and sensitivity of an off-axis field of the optical imaging lens assembly are reduced, thereby improving the imaging quality and further being beneficial to assembly of the lenses.

In some embodiments of the disclosure, the optical imaging lens assembly satisfy 0.4<f/(f1−f2)<0.6, where, the f is a total effective focal length of the optical imaging lens assembly, the f1 is an effective focal length of the first lens, and the f2 is an effective focal length of the second lens. In some embodiments, the f, the f1 and the f2 satisfy 0.434/ (f1−f2)<0.55. By limiting a ratio of the total effective focal length of the optical imaging lens assembly to a difference between the effective focal lengths of the first lens and the second lens within a certain range, the aberration of an axial FOV and the aberration of an internal FOV are reduced, and the imaging quality of the optical imaging lens assembly are improved.

In some embodiments of the disclosure, the optical imaging lens assembly satisfy the following relationship: 66°<FOV<76°, where, the FOV is a maximum FOV of the optical imaging lens assembly. By restricting the maximum FOV of the optical imaging lens assembly within a certain range, the optical imaging lens assembly obtains a wide range of imaging FOV, and the imaging content is enriched.

In some embodiments of the disclosure, the optical imaging lens assembly satisfies the following relationship: 0.5<R4/R3<0.8, where, the R4 is a radius of curvature of the image-side surface of the second lens, and the R3 is a radius of curvature of the object-side surface of the second lens. By limiting a ratio of the radius of curvature of the image-side surface of the second lens to the radius of curvature of the object-side surface of the second lens within a certain range, the cometic aberration of the optical imaging lens assembly is reduced, and the imaging quality is improved.

In some embodiments of the disclosure, the optical imaging lens assembly satisfies the following relationship: $0.6 < (T23+CT3)/T34 < 1.1$, where, the T23 is an air space on the optical axis between the second lens and the third lens, the CT3 is a central thickness of the third lens on the optical axis, and the T34 is an air space on the optical axis between the third lens and the fourth lens. By matching the central thickness of the third lens with the air spaces on the two sides thereof, the sensitivity of each of the second lens and the third lens is reduced, thereby being beneficial to machining and assembly of the lens.

In some embodiments of the disclosure, the optical imaging lens assembly satisfies the following relationship: $0.1 < f123/f4567 < 0.9$, where, the f123 is a synthetic focal length for the first lens, the second lens and the third lens, and the f4567 is a synthetic focal length for the fourth lens, the fifth lens, the sixth lens and the seven lens. By limiting a ratio of a synthetic focal length for the first lens, the second lens and the third lens to a synthetic focal length for the fourth lens, the fifth lens, the sixth lens and the seven lens within a certain range, the distribution of the refractive power of each lens is improved, thereby being beneficial to the machining and molding of the lens.

In some embodiments of the disclosure, the optical imaging lens assembly satisfies the following relationship: $1.8 < (SAG21+SAG22)/CT2 < 3.8$, where, the SAG21 is an axial distance from an intersection between the object-side surface of the second lens and the optical axis to an effective radius vertex of the object-side surface of the second lens, the SAG22 is an axial distance from an intersection between the image-side surface of the second lens and the optical axis to an effective radius vertex of the image-side surface of the second lens, and the CT2 is a central thickness of the second lens on the optical axis. By limiting a ratio of a sum of rises of both the object-side surface and the image-side surface of the second lens to the central thickness of the second lens on the optical axis, the refractive power and shape of the second lens is well controlled to distribute the refractive power of the second lens and balance the aberration.

In some embodiments of the disclosure, the optical imaging lens assembly satisfies the following relationship: $0.2 < (SAG61+SAG62)/(SAG51+SAG52) < 0.7$, where, the SAG61 is an axial distance from an intersection between the object-side surface of the sixth lens and the optical axis to an effective radius vertex of the object-side surface of the sixth lens, the SAG62 is an axial distance from an intersection between the image-side surface of the sixth lens and the optical axis to an effective radius vertex of the image-side surface of the sixth lens, the SAG51 is an axial distance from an intersection between the object-side surface of the fifth lens and the optical axis to an effective radius vertex of the object-side surface of the fifth lens, and the SAG52 is an axial distance from an intersection between the image-side surface of the fifth lens and the optical axis to an effective radius vertex of the image-side surface of the fifth lens. By limiting a ratio of a sum of rises of the object-side surface and the image-side surface of the sixth lens to a sum of rises of the object-side surface and the image-side surface of the fifth lens, the aberration, such as distortion field curvature, of the off-axis FOV is improved, and the imaging quality is improved.

The optical imaging lens assembly according to some embodiments of the disclosure uses a plurality of lenses, such as the seven lenses. By reasonably distributing the refractive power and surface type of each lens, the central thickness of each lens, the axial distance of each lens and the like, the size of the imaging lens is effectively shortened, the sensitivity of the imaging lens is reduced, and the machinability of the imaging lens is improved; and therefore, the optical imaging lens assembly is more beneficial to production and is adapted for portable electronic products. Furthermore, the optical imaging lens assembly of some embodiments of the disclosure further has a large rear focal length, high imaging quality and other excellent optical performances.

In some embodiments of the disclosure, at least one of mirror surfaces of the lenses is an aspherical mirror surface, that is, at least one from the object-side surface of the first lens to the image-side surface of the seventh lens is the aspherical mirror surface. The aspherical mirror surface has the characteristic that the curvature keeps changing continuously from a center of the lens to a periphery of the lens. Unlike a spherical lens with a constant curvature from a center of the lens to a periphery of the lens, an aspherical lens has a better radius of curvature characteristic and the advantages of improving distortion aberrations and improving astigmatic aberrations. With adoption of the aspherical lens, the aberrations during imaging are eliminated as much as possible, thereby improving the imaging quality. In some embodiments, at least one of the object-side surface and the image-side surface of each of the first lens, the second lens, the third lens, the fourth lens, the fifth lens, the sixth lens and the seventh lens is the aspherical mirror surface. In some embodiments, both the object-side surface and the image-side surface of each of the first lens, the second lens and the third lens are the aspherical mirror surfaces. In some embodiments, both the object-side surface and the image-side surface of each of the fourth lens, the fifth lens, the sixth lens and the seventh lens are the aspherical mirror surfaces. In some embodiments, both the object-side surface and the image-side surface of each of the first lens to the seventh lens are the aspherical mirror surfaces.

However, those skilled in the art should know that the number of the lenses forming the optical imaging lens assembly is changed without departing from the technical solutions claimed in the disclosure to achieve each result and advantage described in the specification. For example, although descriptions are made in the implementation with seven lenses as an example, the optical imaging lens assembly is not limited to seven lenses. If necessary, the optical imaging lens assembly may further include another number of lenses.

Some embodiments of the optical imaging lens assembly applied to the above-mentioned implementation mode will further be described below with reference to the drawings.

Embodiment 1

The optical imaging lens assembly according to embodiment 1 of the disclosure will be described below with reference to FIG. 1 to FIG. 2D. FIG. 1 is a structure diagram of an optical imaging lens assembly according to embodiment 1 of the disclosure.

As shown in FIG. 1, an optical imaging lens assembly includes a diaphragm STO, a first lens E1, a second lens E2, a third lens E3, a fourth lens E4, a fifth lens E5, a sixth lens E6 and a seventh lens E7 which are provided in sequence from an object side to an image side along an optical axis.

The first lens E1 has a positive refractive power, an object-side surface S1 thereof is a convex surface, and an image-side surface S2 is a concave surface. The second lens E2 has a negative refractive power, an object-side surface S3 thereof is a convex surface, and an image-side surface S4 is a concave surface. The third lens E3 has a negative refractive power, an object-side surface S5 thereof is a concave surface, and an image-side surface S6 is a concave surface. The fourth lens E4 has a positive refractive power, an object-side surface S7 thereof is a concave surface, and an image-side surface S8 is a convex surface. The fifth lens E5 has a negative refractive power, an object-side surface S9 thereof is a concave surface, and an image-side surface S10 is a convex surface. The sixth lens E6 has a positive refractive power, an object-side surface S11 thereof is a convex surface, and an image-side surface S12 is a convex surface.

The seventh lens E7 has a negative refractive power, an object-side surface S13 thereof is a concave surface, and an image-side surface S14 is a concave surface. The optical imaging lens assembly is provided with an imaging surface S15. Light from an object sequentially penetrates through each of the surfaces S1 to S14 and is finally imaged on the imaging surface S15.

Table 1 shows basic parameters of the optical imaging lens assembly of embodiment 1, in which the units of radius of curvature, thickness/distance and focal length are millimeter (mm).

TABLE 1

| Surface number | Surface type | Radius of curvature | Thickness/ distance | Refractive index | Abbe number | Focal length | Conic coefficient |
|---|---|---|---|---|---|---|---|
| OBJ | Spherical | Infinite | Infinite | | | | |
| STO | Spherical | Infinite | −0.7283 | | | | |
| S1 | Aspherical | 3.4689 | 0.7426 | 1.55 | 56.1 | 11.65 | 0.1082 |
| S2 | Aspherical | 7.0515 | 0.0200 | | | | 1.0056 |
| S3 | Aspherical | 4.7615 | 0.3100 | 1.67 | 20.4 | −21.79 | 1.5219 |
| S4 | Aspherical | 3.4930 | 0.9801 | | | | 0.5317 |
| S5 | Aspherical | −204.9673 | 0.4662 | 1.67 | 20.4 | −97.36 | 99.0000 |
| S6 | Aspherical | 95.1716 | 1.3708 | | | | −99.0000 |
| S7 | Aspherical | −22.7849 | 1.3692 | 1.55 | 56.1 | 37.72 | 8.8085 |
| S8 | Aspherical | −11.0470 | 0.2872 | | | | 4.3136 |
| S9 | Aspherical | −19.4307 | 0.4483 | 1.55 | 56.1 | −108.57 | −99.0000 |
| S10 | Aspherical | −29.1420 | 0.2328 | | | | 29.7850 |
| S11 | Aspherical | 5.5754 | 0.6213 | 1.55 | 56.1 | 4.78 | −0.4763 |
| S12 | Aspherical | −4.7100 | 0.4062 | | | | −3.1700 |
| S13 | Aspherical | −3.6192 | 0.5000 | 1.54 | 55.7 | −4.34 | −1.1858 |
| S14 | Aspherical | 6.8717 | 8.2554 | | | | −0.0537 |
| S15 | Spherical | Infinite | | | | | |

In the embodiment 1, a total effective focal length f of the optical imaging lens assembly is 14.93 mm, the axial distance TTL from the object-side surface S1 of the first lens E1 to the imaging surface S15 is 16.01 mm, and a half of the diagonal length ImgH in an effective pixel region on the imaging surface S15 is 11.68 mm.

In embodiment 1, both the object-side surface and image-side surface of any lens in the first lens E1 to the seventh lens E7 are aspherical surfaces, and the surface type x of each aspherical lens is defined by use of, but not limited to, the following aspherical surface formula:

$$x = \frac{ch^2}{1 + \sqrt{1 - (k+1)c^2 h^2}} + \sum A_i h^i \quad (1)$$

where x is a distance rise between a position of the aspherical surface at a height h in a direction of the optical axis and a aspherical surface vertex; c is a paraxial curvature of the aspherical surface, c=1/R (namely, the paraxial curvature c is a reciprocal of the radius of curvature R in Table 1); k is the cone coefficient; and Ai is the i-th-order correction coefficient of the aspherical surface. Table 2 shows the higher-order coefficients $A_4$, $A_6$, $A_8$, $A_{10}$, $A_{12}$, $A_{14}$, $A_{16}$, $A_{18}$ and $A_{20}$ applicable to the aspherical mirror surfaces S1-S14 in embodiment 1.

TABLE 2

| Surface number | A4 | A6 | A8 | A10 | A12 | A14 | A16 | A18 | A20 |
|---|---|---|---|---|---|---|---|---|---|
| S1 | −2.6638E−04 | 4.8441E−04 | −6.3508E−04 | 5.9495E−04 | −3.2211E−04 | 1.0498E−04 | −1.9299E−05 | 1.8104E−06 | −5.8944E−08 |
| S2 | −8.1330E−03 | 1.7001E−02 | −1.9574E−02 | 1.3288E−02 | −5.8188E−03 | 1.6963E−03 | −3.1792E−04 | 3.4585E−05 | −1.6521E−06 |
| S3 | −6.7858E−03 | 1.6238E−02 | −1.8001E−02 | 1.1868E−02 | −5.1286E−03 | 1.4988E−03 | −2.8592E−04 | 3.1960E−05 | −1.5933E−06 |

TABLE 2-continued

| Surface number | A4 | A6 | A8 | A10 | A12 | A14 | A16 | A18 | A20 |
|---|---|---|---|---|---|---|---|---|---|
| S4 | −1.4511E−04 | 2.6887E−03 | −1.6370E−03 | 5.8790E−04 | −1.2184E−04 | 4.1113E−05 | −1.5143E−05 | 2.8428E−06 | −2.1161E−07 |
| S5 | −1.7005E−02 | −9.2176E−04 | 2.6893E−03 | −3.0133E−03 | 2.1235E−03 | −9.2652E−04 | 2.4706E−04 | −3.6671E−05 | 2.3224E−06 |
| S6 | −1.5948E−02 | 1.3516E−04 | 8.9287E−04 | −6.9069E−04 | 3.6904E−04 | −1.2316E−04 | 2.5742E−05 | −3.0592E−06 | 1.5477E−07 |
| S7 | −4.6688E−03 | 2.6320E−04 | −2.4265E−04 | 8.2145E−05 | −1.5713E−05 | 2.4597E−06 | −2.6177E−07 | 1.5166E−08 | −3.5805E−10 |
| S8 | −5.8863E−03 | −9.2024E−04 | 4.9786E−04 | −2.6224E−04 | 6.5549E−05 | −8.5908E−06 | 6.1415E−07 | −2.1895E−08 | 2.8329E−10 |
| S9 | 2.3127E−03 | −3.8028E−03 | 1.7215E−03 | −4.9956E−04 | 8.7259E−05 | −9.2460E−06 | 5.7947E−07 | −1.9593E−08 | 2.7293E−10 |
| S10 | −2.0735E−02 | 7.2216E−04 | 1.0727E−03 | −2.8771E−04 | 3.8620E−05 | −3.1437E−06 | 1.5661E−07 | −4.3860E−09 | 5.2743E−11 |
| S11 | −2.5664E−02 | 1.5082E−03 | −6.0728E−05 | 2.5253E−05 | −4.3560E−06 | 3.5389E−07 | −1.5812E−08 | 3.8204E−10 | −3.9448E−12 |
| S12 | 1.0343E−02 | −2.3605E−03 | 3.6381E−04 | −2.3336E−05 | −3.1320E−07 | 1.3748E−07 | −8.4620E−09 | 2.3042E−10 | −2.4450E−12 |
| S13 | 6.8389E−03 | −7.1464E−04 | 2.2737E−04 | −3.0706E−05 | 2.1409E−06 | −8.4832E−08 | 1.8779E−09 | −2.0220E−11 | 6.4621E−14 |
| S14 | −8.7000E−03 | 4.7660E−04 | −7.3908E−06 | −1.3065E−06 | 1.3027E−07 | −6.0319E−09 | 1.5733E−10 | −2.2406E−12 | 1.3690E−14 |

Figure 2A:
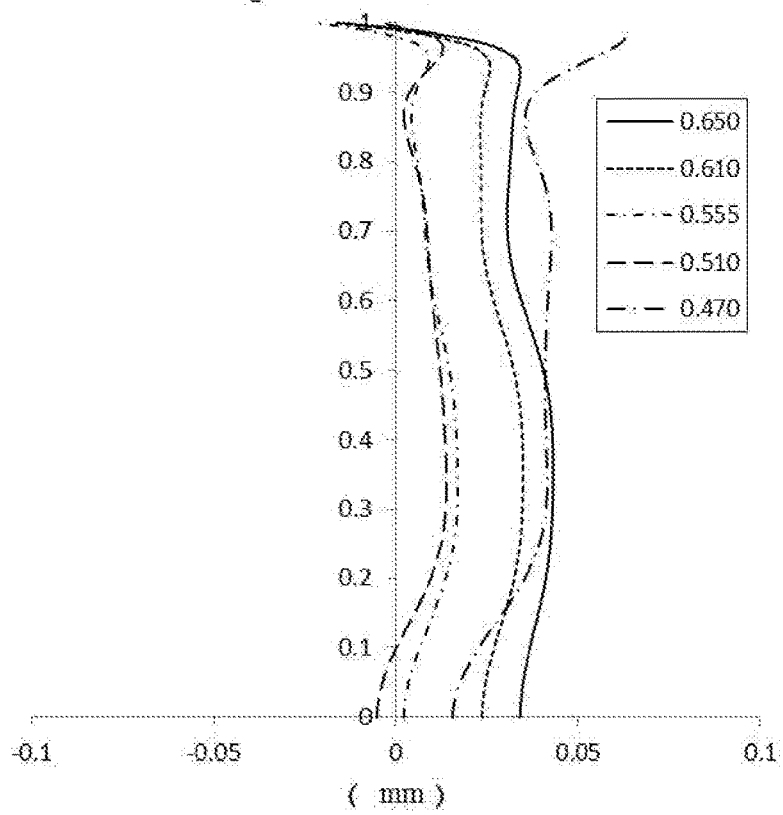
FIG. 2A to FIG. 2D illustrate a longitudinal aberration curve, astigmatism curve, distortion curve and lateral color curve of an optical imaging lens assembly according to embodiment 1 respectively.
Figure 2B:
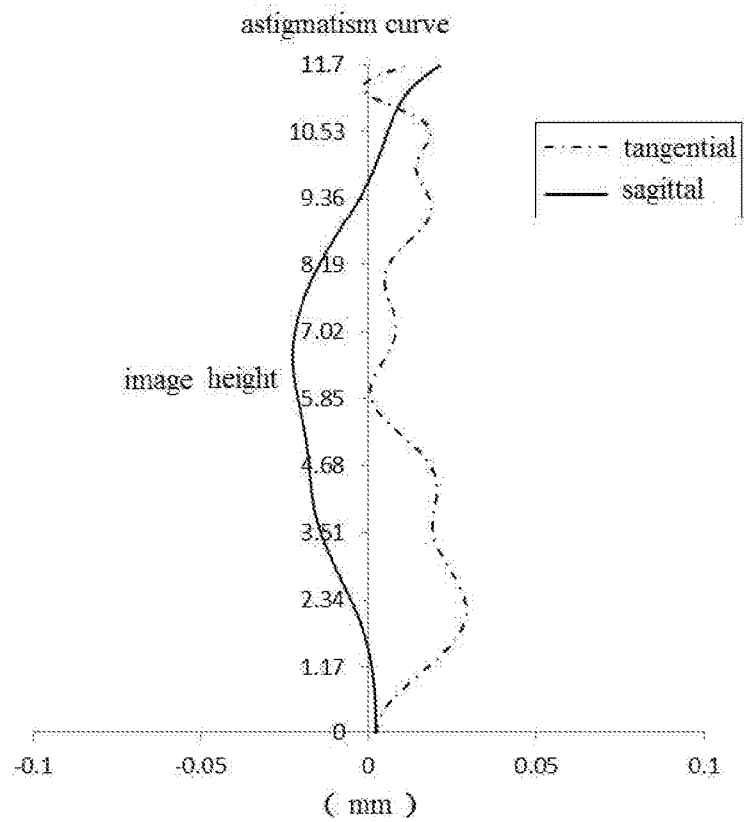
Figure 2C:
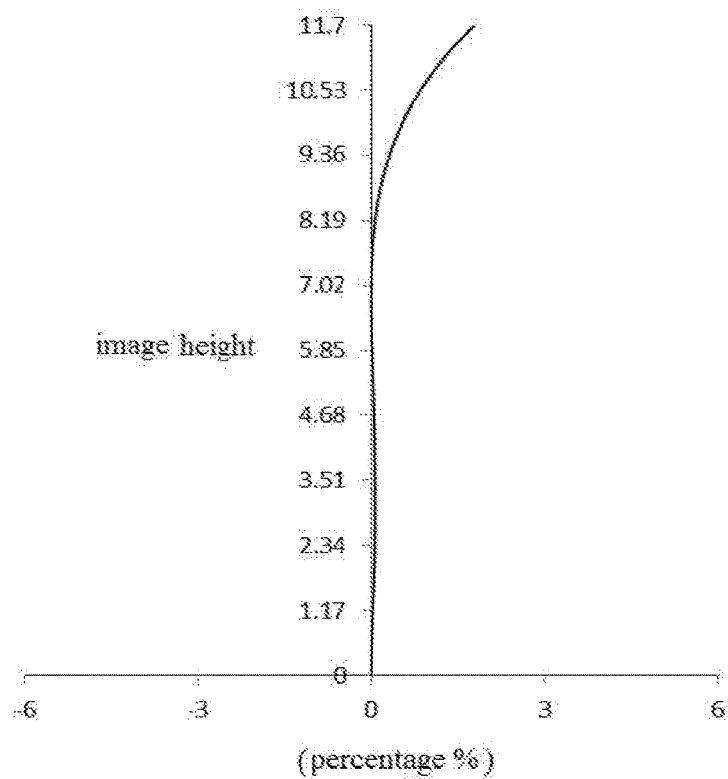
Figure 2D:
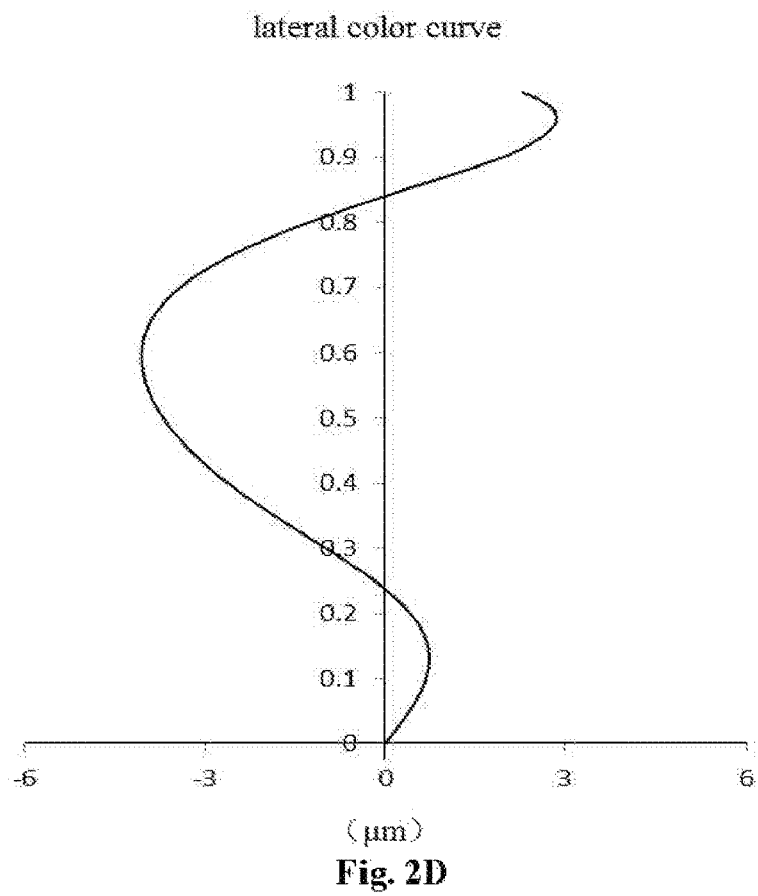

FIG. 2A illustrates a longitudinal aberration curve of the optical imaging lens assembly according to embodiment 1 to represent deviation of a convergence focal point after light with different wavelengths passes through the lens. FIG. 2B illustrates an astigmatism curve of the optical imaging lens assembly according to embodiment 1 to represent a tangential image surface curvature and a sagittal image surface curvature. FIG. 2C illustrates a distortion curve of the optical imaging lens assembly according to embodiment 1 to represent distortion values corresponding to different image heights. FIG. 2D illustrates a lateral color curve of the optical imaging lens assembly according to embodiment 1 to represent deviation of different image heights on the imaging surface after the light passes through the lens. According to FIG. 2A to FIG. 2D, it can be seen that the optical imaging lens assembly provided in embodiment 1 achieves high imaging quality. The unit of the abscissa shown in FIG. 2 is micron (μm).

Embodiment 2

Figure 3:
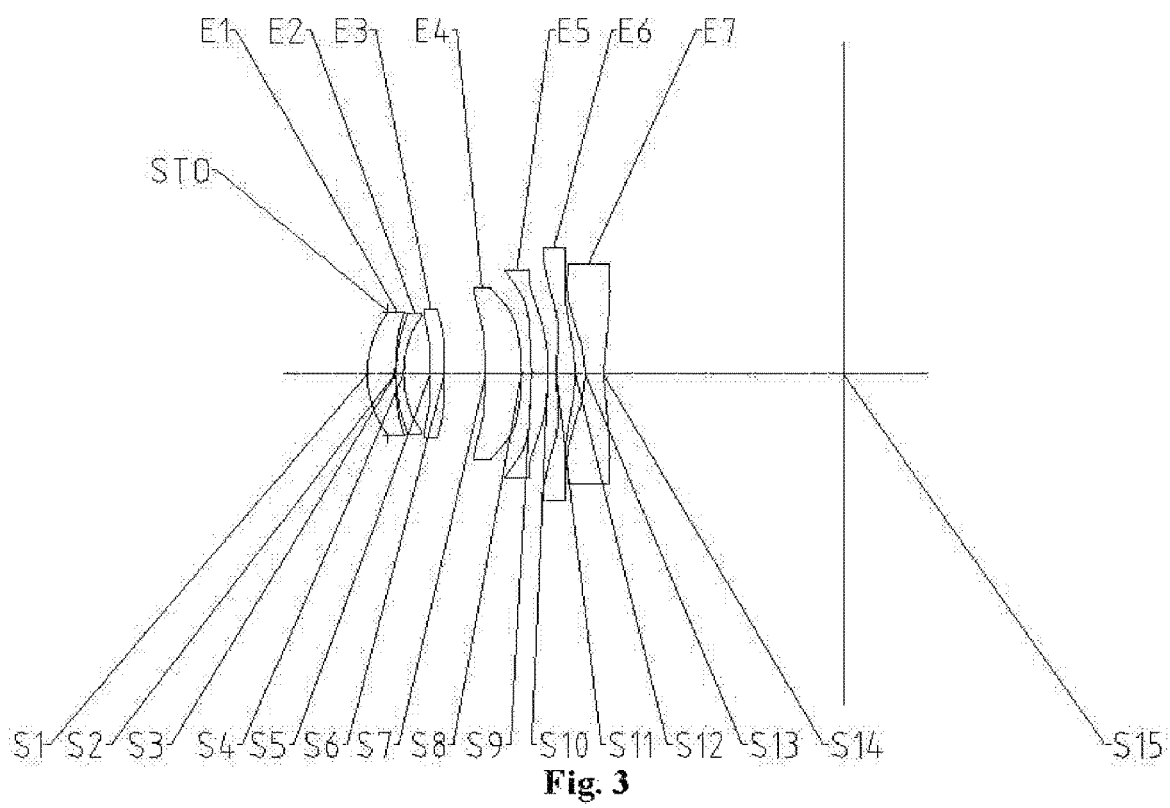
FIG. 3 is a structure diagram of an optical imaging lens assembly according to embodiment 2 of the disclosure.

The optical imaging lens assembly according to embodiment 2 of the disclosure will be described below with reference to FIG. 3 to FIG. 4D. In the embodiment and the following embodiments, for the ease of clarity, a part of descriptions similar to embodiment 1 are omitted. FIG. 3 is a structure diagram of the optical imaging lens assembly according to embodiment 2 of the disclosure.

As shown in FIG. 3, an optical imaging lens assembly includes a diaphragm STO, a first lens E1, a second lens E2, a third lens E3, a fourth lens E4, a fifth lens E5, a sixth lens E6 and a seventh lens E7 which are provided from an object side to an image side along an optical axis.

The first lens E1 has a positive refractive power, an object-side surface S1 of the first lens E1 is a convex surface, and an image-side surface S2 is of the first lens E1 a concave surface. The second lens E2 has a negative refractive power, an object-side surface S3 thereof is a convex surface, and an image-side surface S4 is a concave surface. The third lens E3 has a negative refractive power, an object-side surface S5 of the third lens E3 is a convex surface, and an image-side surface S6 of the third lens E3 is a concave surface. The fourth element E4 has a positive refractive power, an object-side surface S7 of the fourth element E4 is a concave surface, and an image-side surface S8 of the fourth element E4 is a convex surface. The fifth lens E5 has a negative refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical imaging lens assembly is provided with an imaging surface S15. Light from an object sequentially penetrates through each of the surfaces S1 to S14 and is finally imaged on the imaging surface S15.

In the embodiment 2, a total effective focal length f of the optical imaging lens assembly is 15.98 mm, an axial distance TTL from the object-side surface S1 of the first lens E1 to the imaging surface S15 is 17.06 mm, and a half of the diagonal length ImgH in an effective pixel region on the imaging surface S15 is 11.88 mm.

Table 3 shows basic parameters of the optical imaging lens assembly of embodiment 2, in which the units of radius of curvature, thickness/distance and focal length are millimeter (mm). Table 4 shows high-order coefficients applied to each aspherical mirror surface in embodiment 2. A surface type of each aspherical surface can be defined by formula (1) given in embodiment 1.

TABLE 3

| Surface number | Surface type | Radius of curvature | Thickness/ distance | Refractive index | Abbe number | Focal length | Conic coefficient |
|---|---|---|---|---|---|---|---|
| OBJ | Spherical | Infinite | Infinite | | | | |
| STO | Spherical | Infinite | −0.7757 | | | | |
| S1 | Aspherical | 3.8005 | 0.9951 | 1.55 | 56.1 | 11.92 | 0.1005 |
| S2 | Aspherical | 8.2942 | 0.0200 | | | | 1.6776 |
| S3 | Aspherical | 5.8133 | 0.2900 | 1.67 | 20.4 | −21.34 | 1.9557 |
| S4 | Aspherical | 4.0431 | 0.9585 | | | | 0.5500 |
| S5 | Aspherical | 377.4418 | 0.5098 | 1.67 | 20.4 | −175.88 | −99.0000 |
| S6 | Aspherical | 89.3166 | 1.4885 | | | | 0.5328 |
| S7 | Aspherical | −18.3801 | 1.2800 | 1.55 | 56.1 | 56.31 | 12.7687 |
| S8 | Aspherical | −11.7860 | 0.3636 | | | | 3.4633 |

TABLE 3-continued

| Surface number | Surface type | Radius of curvature | Thickness/ distance | Material Refractive index | Abbe number | Focal length | Conic coefficient |
|---|---|---|---|---|---|---|---|
| S9 | Aspherical | −22.2554 | 0.5825 | 1.55 | 56.1 | −374.90 | −97.3979 |
| S10 | Aspherical | −25.2013 | 0.2807 | | | | 30.6644 |
| S11 | Aspherical | 5.5731 | 0.6913 | 1.55 | 56.1 | 4.87 | −0.4802 |
| S12 | Aspherical | −4.8678 | 0.3460 | | | | −4.0753 |
| S13 | Aspherical | −3.7039 | 0.6536 | 1.54 | 55.7 | −4.34 | −1.2211 |
| S14 | Aspherical | 6.6726 | 8.6029 | | | | −0.0673 |
| S15 | Spherical | Infinite | | | | | |

TABLE 4

| Surface number | A4 | A6 | A8 | A10 | A12 | A14 | A16 | A18 | A20 |
|---|---|---|---|---|---|---|---|---|---|
| S1 | −1.0688E−04 | 6.6290E−04 | −7.6256E−04 | 6.3091E−04 | −3.0340E−04 | 8.9610E−05 | −1.5682E−05 | 1.4958E−06 | −5.8707E−08 |
| S2 | −9.7082E−03 | 1.9793E−02 | −2.1189E−02 | 1.3860E−02 | −5.9585E−03 | 1.7075E−03 | −3.1242E−04 | 3.2881E−05 | −1.5097E−06 |
| S3 | −7.5039E−03 | 1.8983E−02 | −2.0368E−02 | 1.3438E−02 | −5.9612E−03 | 1.7846E−03 | −3.4250E−04 | 3.7754E−05 | −1.8162E−06 |
| S4 | 6.6380E−04 | 2.9810E−03 | −2.3961E−03 | 1.4291E−03 | −6.8854E−04 | 2.5327E−04 | −5.9409E−05 | 7.7101E−06 | −4.2748E−07 |
| S5 | −1.5748E−02 | 1.7371E−04 | 5.3548E−04 | −6.0626E−04 | 4.1780E−04 | −1.7267E−04 | 4.3974E−05 | −6.2080E−06 | 3.7111E−07 |
| S6 | −1.5091E−02 | 7.1272E−04 | −6.1703E−05 | 5.5744E−05 | −1.8684E−05 | 4.2810E−06 | −2.5823E−07 | −5.0193E−08 | 4.8177E−09 |
| S7 | −4.8970E−03 | 3.0665E−04 | −3.0037E−04 | 1.2090E−04 | −2.7837E−05 | 4.4067E−06 | −4.2903E−07 | 2.2528E−08 | −4.8897E−10 |
| S8 | −4.1905E−03 | −1.3942E−03 | 3.1283E−04 | −1.0144E−04 | 2.1512E−05 | −2.3659E−06 | 1.2376E−07 | −1.4994E−09 | −6.3660E−11 |
| S9 | 3.4958E−03 | −3.1913E−03 | 1.0592E−03 | −2.6215E−04 | 4.1159E−05 | −3.9217E−06 | 2.1595E−07 | −6.1134E−09 | 6.4458E−11 |
| S10 | −2.3618E−02 | 3.2652E−03 | 1.4532E−04 | −1.1313E−04 | 1.9414E−05 | −1.8371E−06 | 1.0153E−07 | −3.0476E−09 | 3.8286E−11 |
| S11 | −2.7226E−02 | 2.2706E−03 | −1.4843E−04 | 1.9880E−05 | −2.1997E−06 | 1.3444E−07 | −4.5652E−09 | 8.3501E−11 | −6.6015E−13 |
| S12 | 1.1472E−02 | −2.9885E−03 | 5.5973E−04 | −5.7977E−05 | 3.4717E−06 | −1.2160E−07 | 2.3224E−09 | −1.8692E−11 | 1.4588E−15 |
| S13 | 8.1464E−03 | −1.2037E−03 | 3.1534E−04 | −3.9161E−05 | 2.6188E−06 | −1.0180E−07 | 2.2737E−09 | −2.6239E−11 | 1.1202E−13 |
| S14 | −1.0171E−02 | 8.2851E−04 | −6.0206E−05 | 3.6550E−06 | −1.7450E−07 | 6.0780E−09 | −1.4048E−10 | 1.8741E−12 | −1.0798E−14 |

Figure 4A:
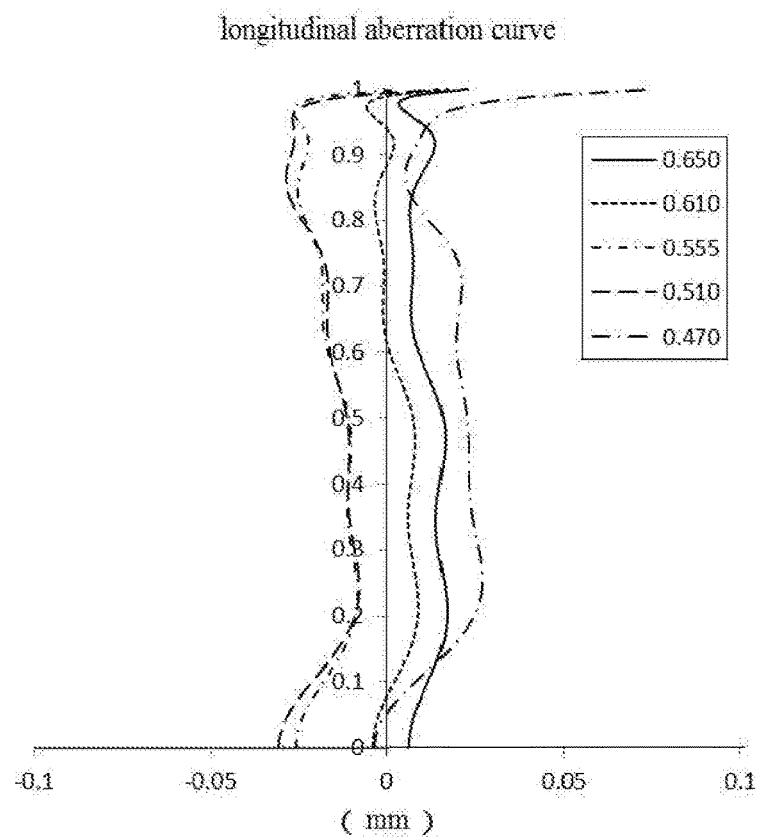
FIG. 4A to FIG. 4D illustrate a longitudinal aberration curve, astigmatism curve, distortion curve and lateral color curve of an optical imaging lens assembly according to embodiment 2 respectively.
Figure 4B:
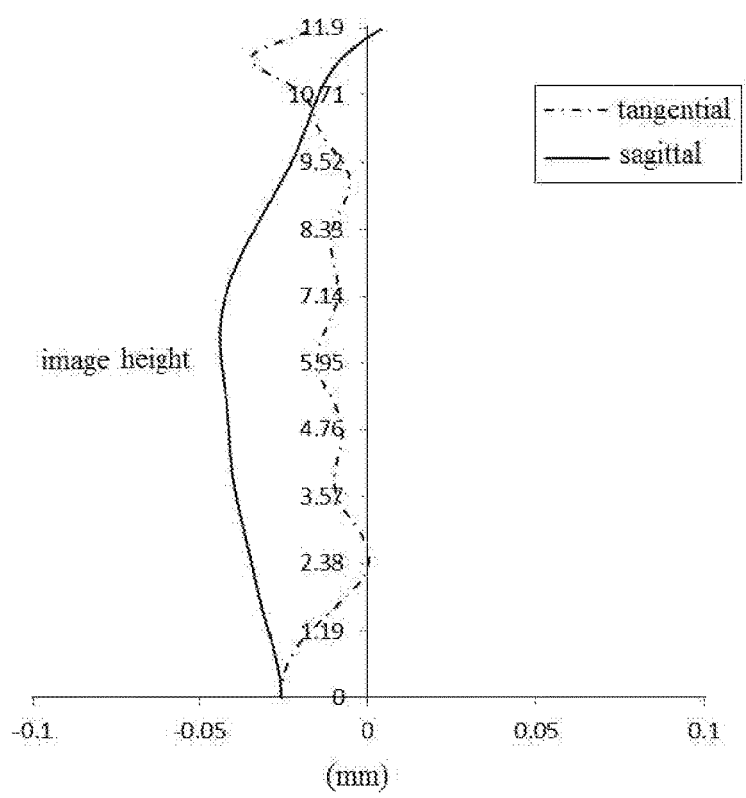
Figure 4C:
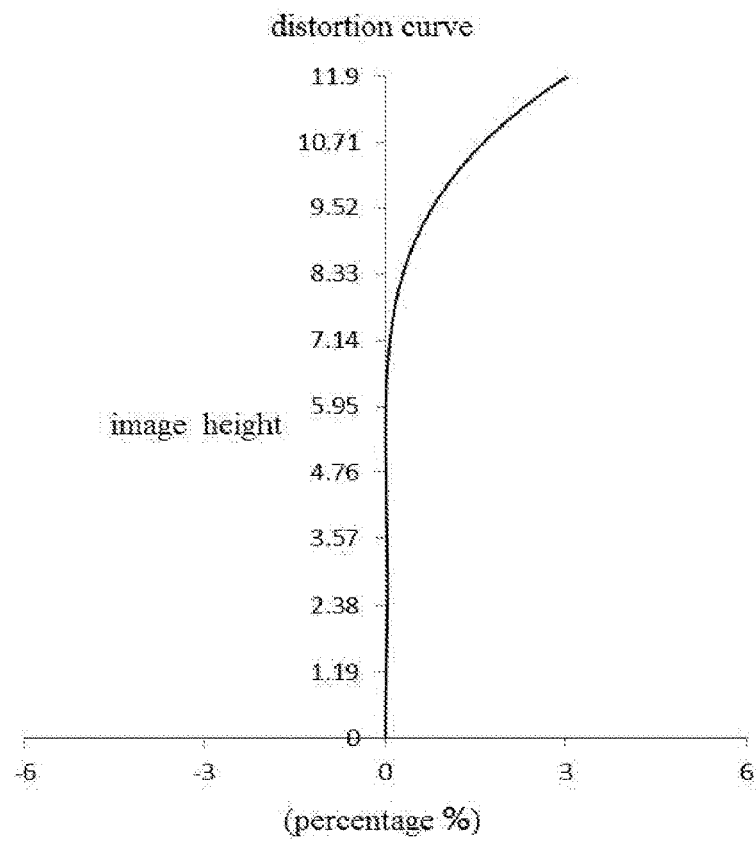
Figure 4D:
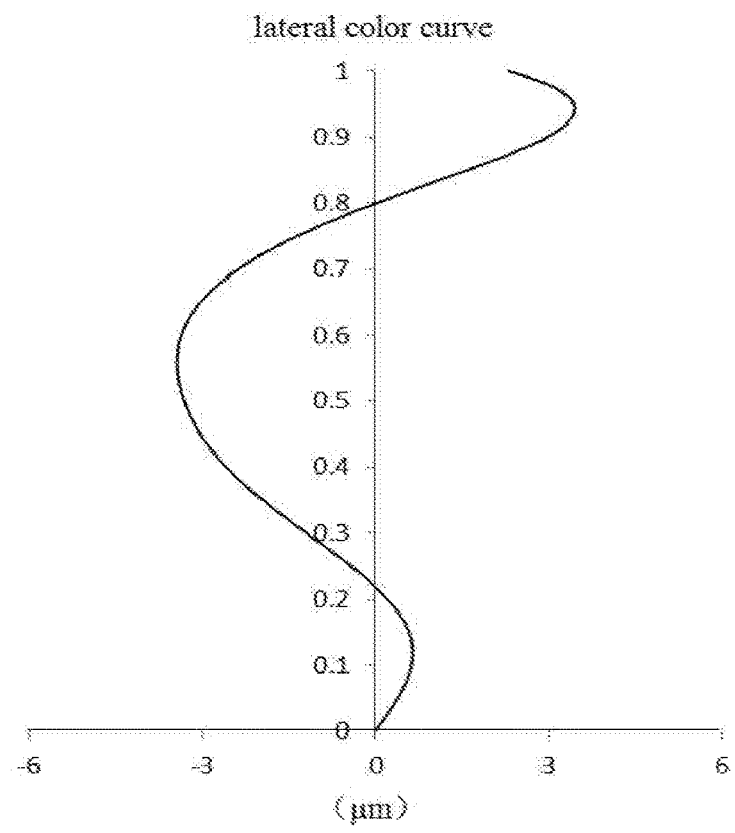

FIG. 4A illustrates a longitudinal aberration curve of the optical imaging lens assembly according to embodiment 2 to represent deviation of a convergence focal point after light with different wavelengths passes through the lens. FIG. 4B illustrates an astigmatism curve of the optical imaging lens assembly according to embodiment 2 to represent a tangential image surface curvature and a sagittal image surface curvature. FIG. 4C illustrates a distortion curve of the optical imaging lens assembly according to embodiment 2 to represent distortion values corresponding to different image heights. FIG. 4D illustrates a lateral color curve of the optical imaging lens assembly according to embodiment 2 to represent deviation of different image heights on the imaging surface after the light passes through the lens. According to FIG. 4A to FIG. 4D, it can be seen that the optical imaging lens assembly provided in embodiment 2 achieves high imaging quality.

Embodiment 3

Figure 5:
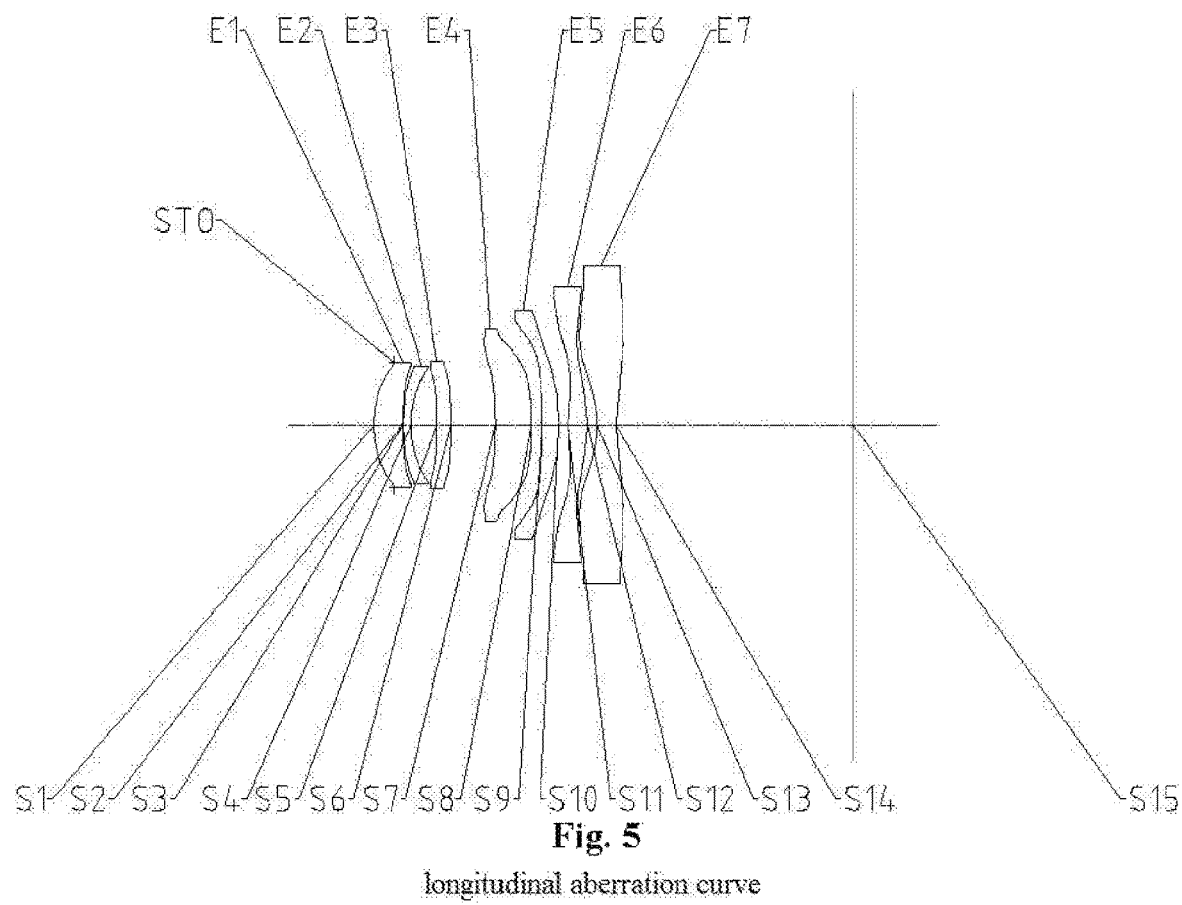
FIG. 5 is a structure diagram of an optical imaging lens assembly according to embodiment 3 of the disclosure.

The optical imaging lens assembly according to embodiment 3 of the disclosure will be described below with reference to FIG. 5 to FIG. 6D. FIG. 5 is a structure diagram of the optical imaging lens assembly according to embodiment 3 of the disclosure.

As shown in FIG. 5, an optical imaging lens assembly includes a diaphragm STO, a first lens E1, a second lens E2, a third lens E3, a fourth lens E4, a fifth lens E5, a sixth lens E6 and a seventh lens E7 which are provided in sequence from an object side to an image side along an optical axis.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a negative refractive power, an object-side surface S5 thereof is a concave surface, and an image-side surface S6 of the third lens E3 is a convex surface. The fourth element E4 has a positive refractive power, an object-side surface S7 thereof is a concave surface, and an image-side surface S8 of the fourth element E4 is a convex surface. The fifth lens E5 has a negative refractive power, an object-side surface S9 thereof is a concave surface, and an image-side surface S10 of the fifth lens E5 is a convex surface. The sixth lens E6 has a positive refractive power, an object-side surface S11 thereof is a convex surface, and an image-side surface S12 is a convex surface. The seventh lens E7 has a negative refractive power, an object-side surface S13 of the seventh lens E7 is a concave surface, and an image-side surface S14 of the seventh lens E7 is a concave surface. The optical imaging lens assembly is provided with an imaging surface S15. Light from an object sequentially penetrates through each of the surfaces S1 to S14 and is finally imaged on the imaging surface S15.

In the embodiment 3, a total effective focal length f of the optical imaging lens assembly is 15.96 mm, an axial distance TTL from the object-side surface S1 of the first lens E1 to the imaging surface S15 is 17.00 mm, and a half of the diagonal length ImgH in an effective pixel region on the imaging surface S15 is 11.88 mm.

Table 5 shows basic parameters of the optical imaging lens assembly of embodiment 3, in which the units of radius of curvature, thickness/distance and focal length are millimeter (mm). Table 6 shows high-order coefficients applied to each aspherical mirror surface in embodiment 3. A surface type of each aspherical surface can be defined by formula (1) given in embodiment 1.

TABLE 5

| Surface number | Surface type | Radius of curvature | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7748 | | | | |
| S1 | Aspherical | 3.8014 | 1.0069 | 1.55 | 56.1 | 11.73 | 0.1055 |
| S2 | Aspherical | 8.4767 | 0.0222 | | | | 1.7537 |
| S3 | Aspherical | 5.9701 | 0.2900 | 1.67 | 20.4 | −21.05 | 2.1086 |
| S4 | Aspherical | 4.1051 | 0.9233 | | | | 0.5625 |
| S5 | Aspherical | −90.3209 | 0.5038 | 1.67 | 20.4 | −212.68 | 99.0000 |
| S6 | Aspherical | −250.000 | 1.5758 | | | | 99.0000 |
| S7 | Aspherical | −20.3190 | 1.2800 | 1.55 | 56.1 | 60.73 | 13.4845 |
| S8 | Aspherical | −12.8784 | 0.3770 | | | | 2.8652 |
| S9 | Aspherical | −23.6759 | 0.5931 | 1.55 | 56.1 | −842.77 | −95.2475 |
| S10 | Aspherical | −25.1811 | 0.3060 | | | | 30.2893 |
| S11 | Aspherical | 5.6282 | 0.6933 | 1.55 | 56.1 | 4.88 | −0.4879 |
| S12 | Aspherical | −4.8438 | 0.3469 | | | | −4.1847 |
| S13 | Aspherical | −3.6818 | 0.6668 | 1.54 | 55.7 | −4.29 | −1.2355 |
| S14 | Aspherical | 6.5270 | 8.4116 | | | | −0.0765 |
| S15 | Spherical | Infinite | | | | | |

TABLE 6

| Surface number | A4 | A6 | A8 | A10 | A12 | A14 | A16 | A18 | A20 |
|---|---|---|---|---|---|---|---|---|---|
| S1 | −4.5927E−05 | 5.8208E−04 | −6.3062E−04 | 5.0974E−04 | −2.3800E−04 | 6.8253E−05 | −1.1537E−05 | 1.0556E−06 | −3.8958E−08 |
| S2 | −8.8327E−03 | 1.7407E−02 | −1.8085E−02 | 1.1452E−02 | −4.7712E−03 | 1.3313E−03 | −2.3805E−04 | 2.4525E−05 | −1.1018E−06 |
| S3 | −6.7107E−03 | 1.6780E−02 | −1.7353E−02 | 1.0984E−02 | −4.6930E−03 | 1.3643E−03 | −2.5583E−04 | 2.7625E−05 | −1.3038E−06 |
| S4 | 7.3342E−04 | 2.8638E−03 | −2.1477E−03 | 1.1506E−03 | −5.0171E−04 | 1.7562E−04 | −3.9758E−05 | 4.9559E−06 | −2.6498E−07 |
| S5 | −1.6081E−02 | 7.0864E−04 | −2.9107E−04 | 2.1977E−04 | −8.9597E−05 | 2.0091E−05 | −3.1286E−07 | −5.5843E−07 | 6.2063E−08 |
| S6 | −1.5286E−02 | 1.2052E−03 | −6.1248E−04 | 4.8980E−04 | −2.3375E−04 | 7.1227E−05 | −1.3024E−05 | 1.3142E−06 | −5.8278E−08 |
| S7 | −5.0237E−03 | 1.3676E−04 | −1.5693E−04 | 6.4258E−05 | −1.3146E−05 | 1.9684E−06 | −1.8872E−07 | 9.7991E−09 | −2.0910E−10 |
| S8 | −3.4086E−03 | −2.0053E−03 | 5.9618E−04 | −1.8045E−04 | 3.5727E−05 | −4.0474E−06 | 2.5274E−07 | −7.4392E−09 | 6.1419E−11 |
| S9 | 3.9039E−03 | −3.6074E−03 | 1.2437E−03 | −3.0550E−04 | 4.7593E−05 | −4.5551E−06 | 2.5607E−07 | −7.5915E−09 | 8.8522E−11 |
| S10 | −2.3545E−02 | 3.1662E−03 | 1.5102E−04 | −1.0566E−04 | 1.7371E−05 | −1.5947E−06 | 8.6229E−08 | −2.5433E−09 | 3.1407E−11 |
| S11 | −2.6596E−02 | 2.0757E−03 | −8.7051E−05 | 7.1290E−06 | −6.4915E−07 | 2.1642E−08 | 3.1719E−10 | −3.2832E−11 | 5.1307E−13 |
| S12 | 1.1448E−02 | −2.9800E−03 | 5.5828E−04 | −5.8046E−05 | 3.5162E−06 | −1.2664E−07 | 2.5821E−09 | −2.5101E−11 | 6.1708E−14 |
| S13 | 8.3879E−03 | −1.3213E−03 | 3.4015E−04 | −4.2120E−05 | 2.8457E−06 | −1.1338E−07 | 2.6540E−09 | −3.3426E−11 | 1.7082E−13 |
| S14 | −1.0460E−02 | 8.8373E−04 | −6.6903E−05 | 4.1646E−06 | −2.0023E−07 | 6.9267E−09 | −1.5795E−10 | 2.0781E−12 | −1.1841E−14 |

Figure 6A:
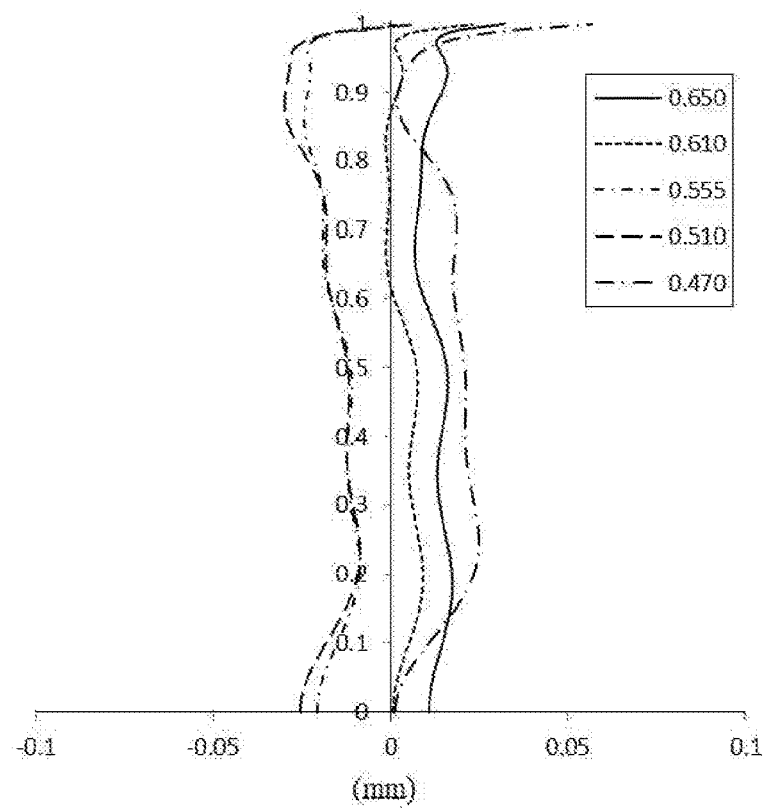
FIG. 6A to FIG. 6D illustrate a longitudinal aberration curve, astigmatism curve, distortion curve and lateral color curve of an optical imaging lens assembly according to embodiment 3 respectively.
Figure 6B:
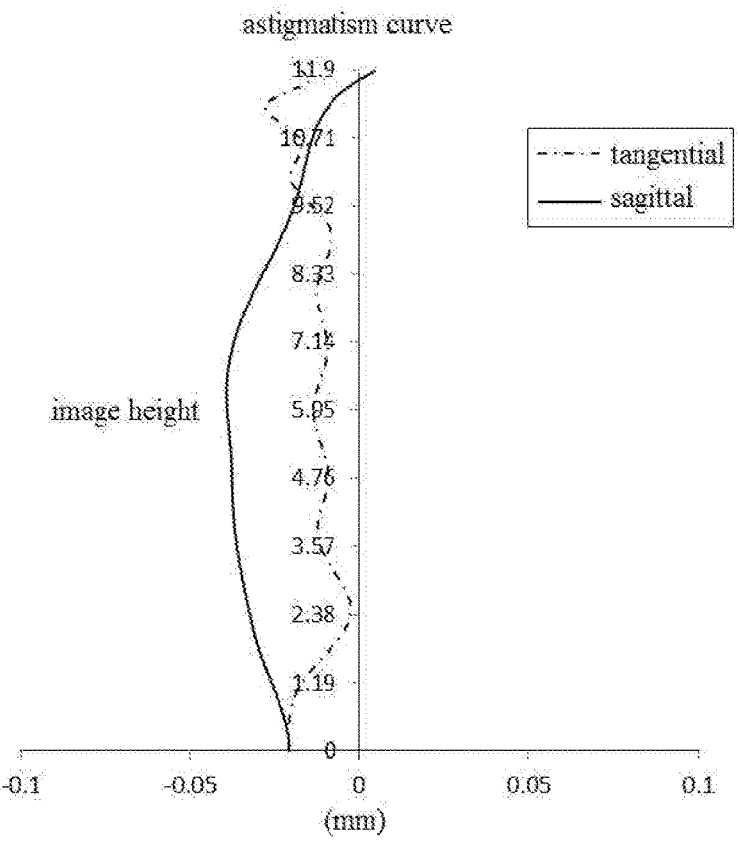
Figure 6C:
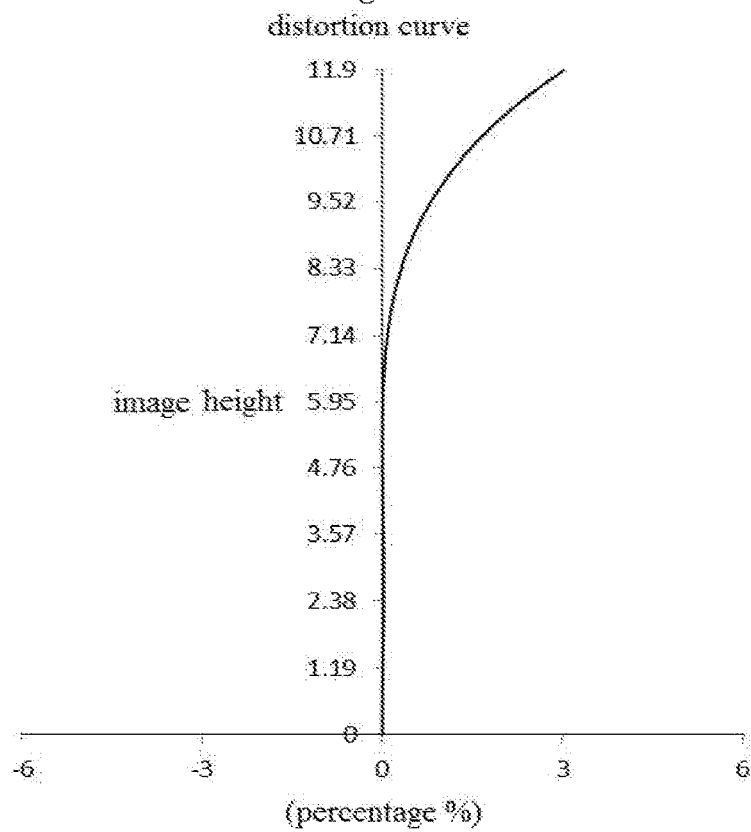
Figure 6D:
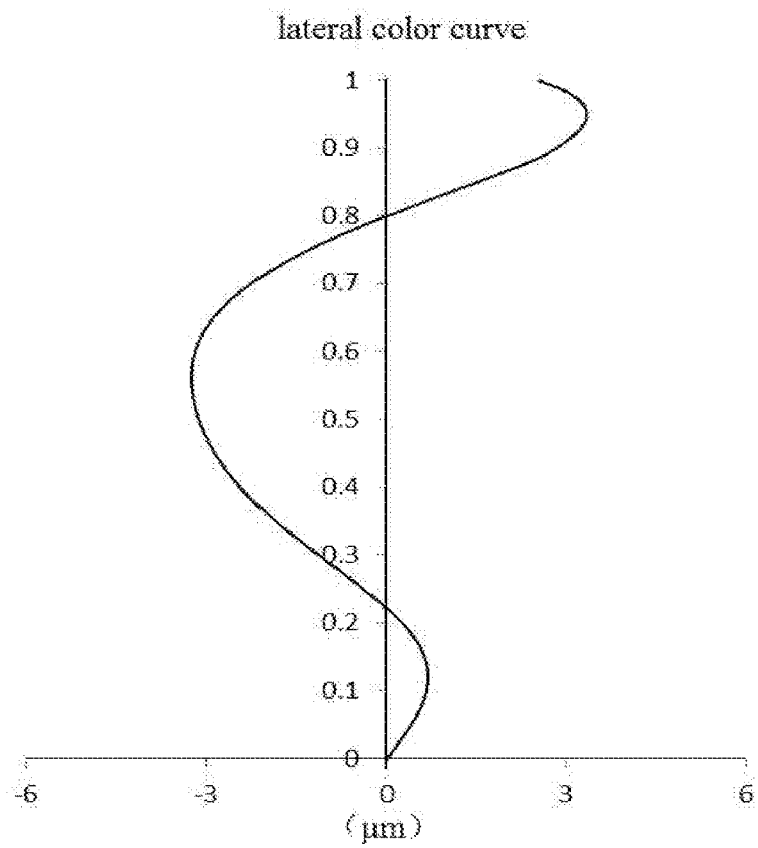

FIG. 6A illustrates a longitudinal aberration curve of the optical imaging lens assembly according to embodiment 3 to represent deviation of a convergence focal point after light with different wavelengths passes through the lens. FIG. 6B illustrates an astigmatism curve of the optical imaging lens assembly according to embodiment 3 to represent a tangential image surface curvature and a sagittal image surface curvature. FIG. 6C illustrates a distortion curve of the optical imaging lens assembly according to embodiment 3 to represent distortion values corresponding to different image heights. FIG. 6D illustrates a lateral color curve of the optical imaging lens assembly according to embodiment 3 to represent deviation of different image heights on the imaging surface after the light passes through the lens. According to FIG. 6A to FIG. 6D, it can be seen that the optical imaging lens assembly provided in embodiment 3 achieves high imaging quality.

Embodiment 4

Figure 7:
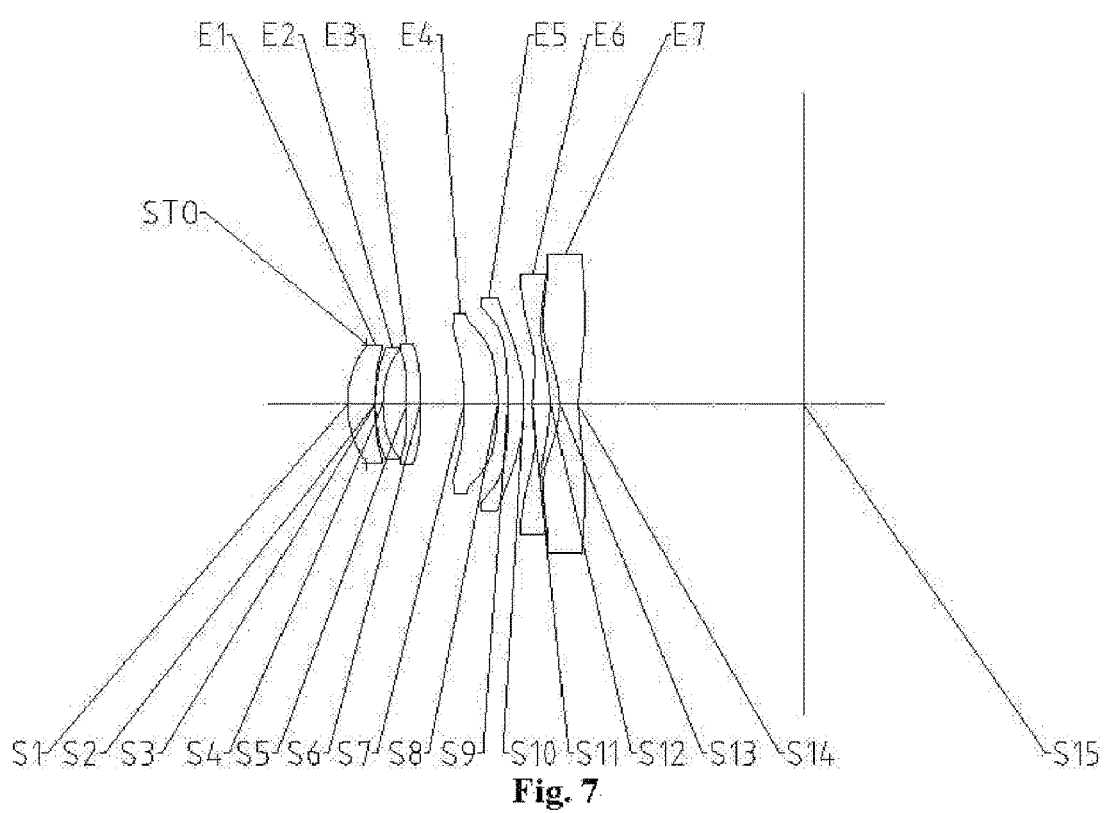
FIG. 7 is a structure diagram of an optical imaging lens assembly according to embodiment 4 of the disclosure.

The optical imaging lens assembly according to embodiment 4 of the disclosure will be described below with reference to FIG. 7 to FIG. 8D. FIG. 7 is a structure diagram of the optical imaging lens assembly according to embodiment 4 of the disclosure.

As shown in FIG. 7, an optical imaging lens assembly includes a diaphragm STO, a first lens E1, a second lens E2, a third lens E3, a fourth lens E4, a fifth lens E5, a sixth lens E6 and a seventh lens E7 which are provided in sequence from an object side to an image side along an optical axis.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 thereof is a convex surface, and an image-side surface S4 of the second lens E2 is a concave surface. The third lens E3 has a negative refractive power, an object-side surface S5 of the third lens E3 is a concave surface, and an image-side surface S6 of the third lens E3 is a convex surface. The fourth element E4 has a positive refractive power, an object-side surface S7 of the fourth element E4 is a concave surface, and an image-side surface S8 of the fourth element E4 is a convex surface. The fifth lens E5 has a positive refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 thereof is a concave surface, and an image-side surface S14 is a concave surface. The optical imaging lens assembly is provided with an imaging surface S15. Light from an object sequentially penetrates through each of the surfaces S1 to S14 and is finally imaged on the imaging surface S15.

In the embodiment 4, a total effective focal length f of the optical imaging lens assembly is 16.23 mm, an axial distance TTL from the object-side surface S1 of the first lens E1 to the imaging surface S15 is 17.30 mm, and a half of the diagonal length ImgH in an effective pixel region on the imaging surface S15 is 11.88 mm.

Table 7 shows basic parameters of the optical imaging lens assembly of embodiment 4, in which the units of radius of curvature, thickness/distance and focal length are millimeter (mm). Table 8 shows high-order coefficients applied to each aspherical mirror surface in embodiment 4. A surface type of each aspherical surface can be defined by formula (1) given in embodiment 1.

optical imaging lens assembly according to embodiment 4 to represent distortion values corresponding to different image heights. FIG. 8D illustrates a lateral color curve of the optical imaging lens assembly according to embodiment 4 to represent deviation of different image heights on the imaging surface after the light passes through the lens. According to FIG. 8A to FIG. 8D, it can be seen that the optical imaging lens assembly provided in embodiment 4 achieves high imaging quality.

Embodiment 5

Figure 9:
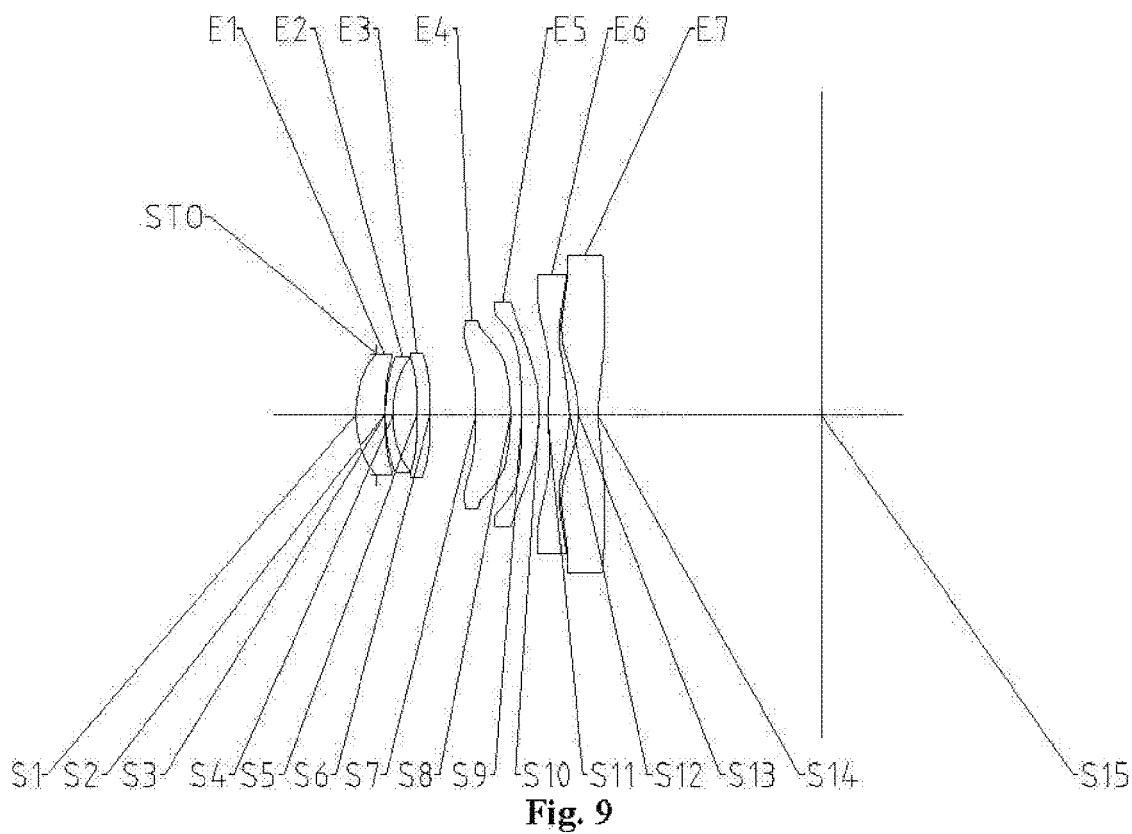
FIG. 9 is a structure diagram of an optical imaging lens assembly according to embodiment 5 of the disclosure.

The optical imaging lens assembly according to embodiment 5 of the disclosure will be described below with reference to FIG. 9 to FIG. 10D. FIG. 9 is a structure diagram of the optical imaging lens assembly according to embodiment 5 of the disclosure.

As shown in FIG. 9, from an object side to an image side along an optical axis, an optical imaging lens assembly

TABLE 7

| Surface number | Surface type | Radius of curvature | Thickness/ distance | Refractive index | Abbe number | Focal length | Conic coefficient |
|---|---|---|---|---|---|---|---|
| OBJ | Spherical | Infinite | Infinite | | | | |
| STO | Spherical | Infinite | −0.7788 | | | | |
| S1 | Aspherical | 3.9033 | 1.0326 | 1.55 | 56.1 | 12.00 | 0.0911 |
| S2 | Aspherical | 8.7583 | 0.0200 | | | | 1.3197 |
| S3 | Aspherical | 6.3207 | 0.2902 | 1.67 | 20.4 | −21.63 | 2.3757 |
| S4 | Aspherical | 4.3119 | 0.9099 | | | | 0.6009 |
| S5 | Aspherical | −129.9013 | 0.5190 | 1.67 | 20.4 | −220.59 | 95.4435 |
| S6 | Aspherical | −1127.1150 | 1.6535 | | | | −99.0000 |
| S7 | Aspherical | −20.5264 | 1.2800 | 1.55 | 56.1 | 70.76 | 14.2525 |
| S8 | Aspherical | −13.6991 | 0.3863 | | | | 2.2001 |
| S9 | Aspherical | −26.1473 | 0.6101 | 1.55 | 56.1 | 426.28 | −90.0943 |
| S10 | Aspherical | −23.7000 | 0.3196 | | | | 29.6140 |
| S11 | Aspherical | 5.6675 | 0.6950 | 1.55 | 56.1 | 4.91 | −0.4722 |
| S12 | Aspherical | −4.8704 | 0.3451 | | | | −4.3794 |
| S13 | Aspherical | −3.6998 | 0.6699 | 1.54 | 55.7 | −4.28 | −1.2447 |
| S14 | Aspherical | 6.4426 | 8.5676 | | | | −0.0828 |
| S15 | Spherical | Infinite | | | | | |

TABLE 8

| Surface number | A4 | A6 | A8 | A10 | A12 | A14 | A16 | A18 | A20 |
|---|---|---|---|---|---|---|---|---|---|
| S1 | 6.7929E−05 | 4.5091E−04 | −4.7065E−04 | 3.7997E−04 | −1.7324E−04 | 4.8224E−05 | −7.8772E−06 | 6.9481E−07 | −2.4621E−08 |
| S2 | −9.0634E−03 | 1.6943E−02 | −1.5867E−02 | 8.8678E−03 | −3.2419E−03 | 7.9942E−04 | −1.2794E−04 | 1.1943E−05 | −4.9048E−07 |
| S3 | −6.8866E−03 | 1.6202E−02 | −1.4792E−02 | 8.0785E−03 | −2.9648E−03 | 7.5041E−04 | −1.2478E−04 | 1.2108E−05 | −5.1922E−07 |
| S4 | 7.0879E−04 | 2.6093E−03 | −1.2550E−03 | 1.9781E−04 | 8.2390E−05 | −4.9450E−05 | 1.3280E−05 | −1.9703E−06 | 1.1891E−07 |
| S5 | −1.6067E−02 | 1.0736E−03 | −7.9674E−04 | 7.2117E−04 | −4.0473E−04 | 1.4405E−04 | −3.0471E−05 | 3.5808E−06 | −1.8330E−07 |
| S6 | −1.5165E−02 | 1.3703E−03 | −7.6131E−04 | 5.8035E−04 | −2.7150E−04 | 8.0883E−05 | −1.4601E−05 | 1.4680E−06 | −6.4975E−08 |
| S7 | −4.8903E−03 | 4.5804E−05 | −1.0703E−04 | 4.7785E−05 | −9.4959E−06 | 1.3822E−06 | −1.2792E−07 | 6.3584E−09 | −1.2944E−10 |
| S8 | −2.9318E−03 | −2.2163E−03 | 6.2415E−04 | −1.6640E−04 | 2.9598E−05 | −2.9957E−06 | 1.5813E−07 | −3.0848E−09 | −1.8274E−11 |
| S9 | 4.2164E−03 | −3.7325E−03 | 1.2168E−03 | −2.8170E−04 | 4.1628E−05 | −3.7619E−06 | 1.9587E−07 | −5.1557E−09 | 4.8134E−11 |
| S10 | −2.3249E−02 | 3.1645E−03 | 1.0187E−04 | −9.1314E−05 | 1.5446E−05 | −1.4483E−06 | 7.9561E−08 | −2.3674E−09 | 2.9275E−11 |
| S11 | −2.5998E−02 | 2.0350E−03 | −7.7307E−05 | 3.2475E−06 | −3.0195E−08 | −2.9109E−08 | 2.6431E−09 | −8.9652E−11 | 1.0879E−12 |
| S12 | 1.1505E−02 | −3.0238E−03 | 5.7341E−04 | −6.0964E−05 | 3.8478E−06 | −1.4909E−07 | 3.4725E−09 | −4.4170E−11 | 2.3146E−13 |
| S13 | 8.5673E−03 | −1.4332E−03 | 3.7329E−04 | −4.7497E−05 | 3.3673E−06 | −1 4447E−07 | 3.7710E−09 | −5.5653E−11 | 3.5908E−13 |
| S14 | −1.0617E−02 | 9.3745E−04 | −7.5586E−05 | 4.9723E−06 | −2.4771E−07 | 8.6980E−09 | −1.9810E−10 | 2.5755E−12 | −1.4375E−14 |

Figure 8A:
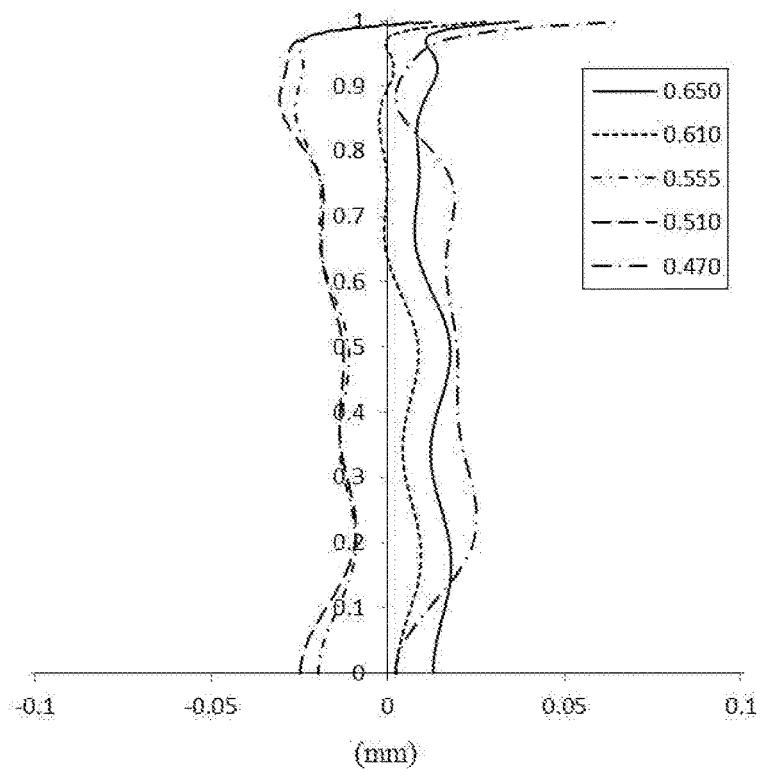
FIG. 8A to FIG. 8D illustrate a longitudinal aberration curve, astigmatism curve, distortion curve and lateral color curve of an optical imaging lens assembly according to embodiment 4 respectively.
Figure 8B:
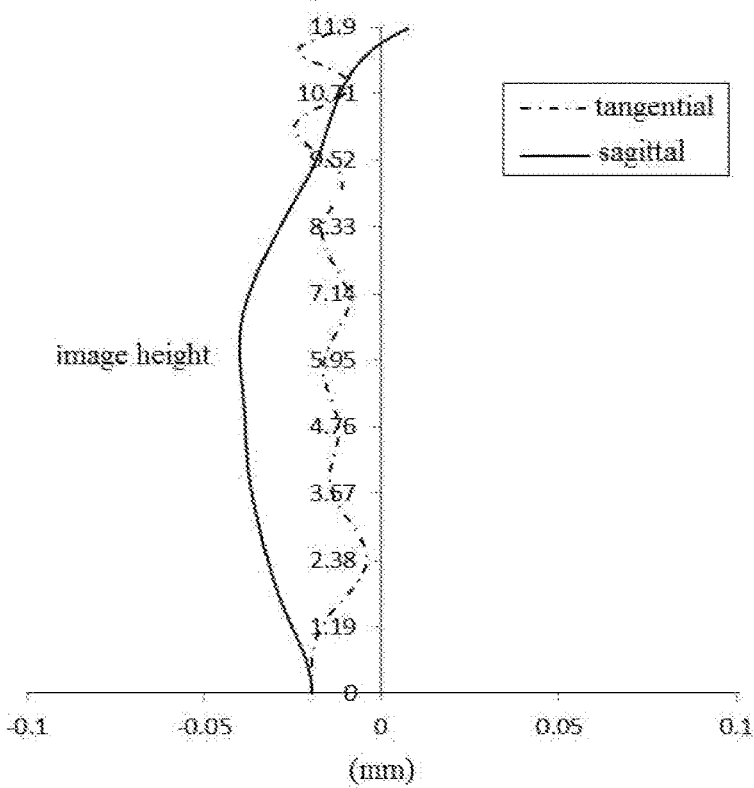
Figure 8C:
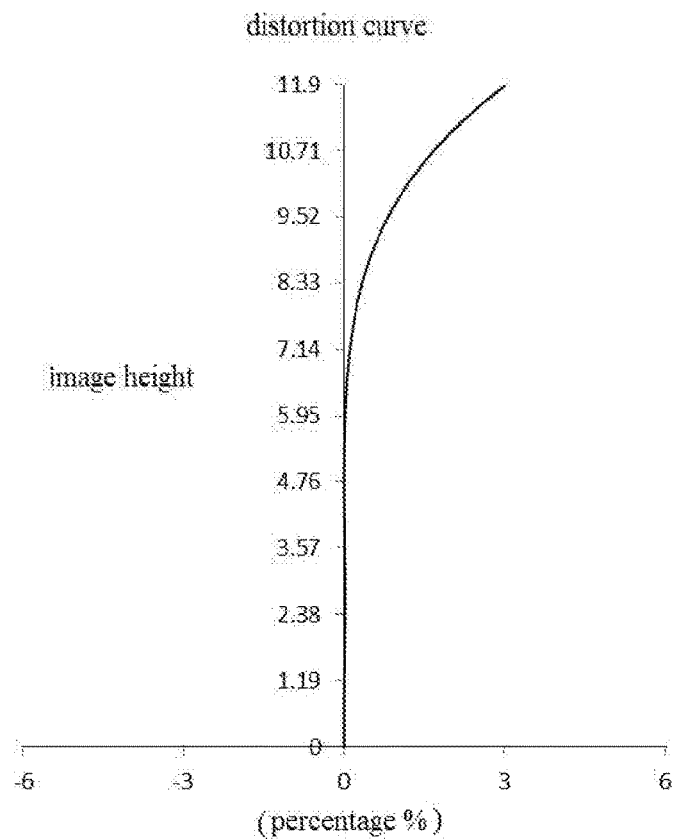
Figure 8D:
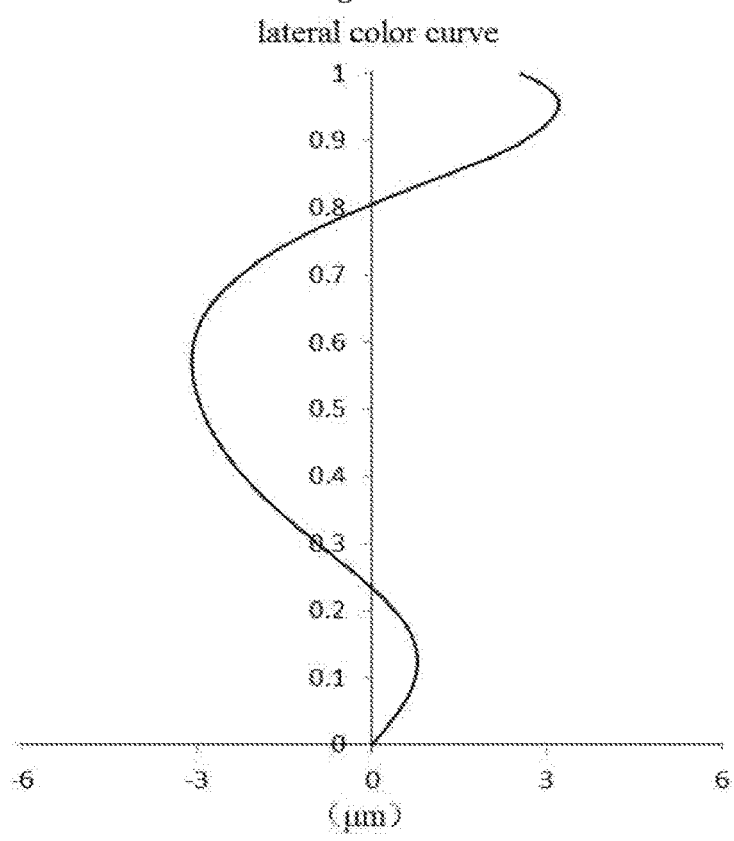

FIG. 8A illustrates a longitudinal aberration curve of the optical imaging lens assembly according to embodiment 4 to represent deviation of a convergence focal point after light with different wavelengths passes through the lens. FIG. 8B illustrates an astigmatism curve of the optical imaging lens assembly according to embodiment 4 to represent a tangential image surface curvature and a sagittal image surface curvature. FIG. 8C illustrates a distortion curve of the sequentially includes: a diaphragm STO, a first lens E1, a second lens E2, a third lens E3, a fourth lens E4, a fifth lens E5, a sixth lens E6 and a seventh lens E7.

The first lens E1 has a positive refractive power, an object-side surface S1 of the first lens E1 is a convex surface, and an image-side surface S2 is a concave surface. The second lens E2 has a negative refractive power, an object-side surface S3 thereof is a convex surface, and an image-side surface S4 is a concave surface. The third lens E3 has a negative refractive power, an object-side surface S5 thereof is a concave surface, and an image-side surface S6 is a concave surface. The fourth element E4 has a positive refractive power, an object-side surface S7 thereof is a concave surface, and an image-side surface S8 is a convex surface. The fifth lens E5 has a positive refractive power, an object-side surface S9 thereof is a concave surface, and an image-side surface S10 is a convex surface. The sixth lens E6 has a positive refractive power, an object-side surface S11 thereof is a convex surface, and an image-side surface S12 is a convex surface. The seventh lens E7 has a negative refractive power, an object-side surface S13 thereof is a concave surface, and an image-side surface S14 is a concave surface. The optical imaging lens assembly is provided with an imaging surface S15. Light from an object sequentially penetrates through each of the surfaces S1 to S14 and is finally imaged on the imaging surface S15.

In the embodiment 5, a total effective focal length f of the optical imaging lens assembly is 16.09 mm, an axial distance TTL from the object-side surface S1 of the first lens E1 to the imaging surface S15 is 17.18 mm, and a half of the diagonal length ImgH in an effective pixel region on the imaging surface S15 is 11.88 mm.

Table 9 shows basic parameters of the optical imaging lens assembly of embodiment 5, in which the units of radius of curvature, thickness/distance and focal length are millimeter (mm). Table 10 shows high-order coefficients applied to each aspherical mirror surface in embodiment 5. A surface type of each aspherical surface can be defined by formula (1) given in embodiment 1.

TABLE 9

| Surface number | Surface type | Radius of curvature | Thickness/ distance | Material Refractive index | Abbe number | Focal length | Cone coefficient |
|---|---|---|---|---|---|---|---|
| OBJ | Spherical | Infinite | Infinite | | | | |
| STO | Spherical | Infinite | −0.7541 | | | | |
| S1 | Aspherical | 3.9116 | 1.0609 | 1.55 | 56.1 | 11.98 | 0.0858 |
| S2 | Aspherical | 8.8019 | 0.0200 | | | | 1.0845 |
| S3 | Aspherical | 6.6806 | 0.3029 | 1.67 | 20.4 | −21.41 | 2.5669 |
| S4 | Aspherical | 4.4664 | 0.8693 | | | | 0.6393 |
| S5 | Aspherical | −2637.1005 | 0.4990 | 1.67 | 20.4 | −404.58 | −99.0000 |
| S6 | Aspherical | 300.0000 | 1.6884 | | | | 99.0000 |
| S7 | Aspherical | −19.5879 | 1.2800 | 1.55 | 56.1 | 86.48 | 14.8936 |
| S8 | Aspherical | −14.1638 | 0.4309 | | | | 2.3708 |
| S9 | Aspherical | −26.4571 | 0.6176 | 1.55 | 56.1 | 386.04 | −99.0000 |
| S10 | Aspherical | −23.7000 | 0.3328 | | | | 29.0613 |
| S11 | Aspherical | 5.5998 | 0.7849 | 1.55 | 56.1 | 4.93 | −0.4692 |
| S12 | Aspherical | −4.9286 | 0.3330 | | | | −4.5154 |
| S13 | Aspherical | −3.7360 | 0.6916 | 1.54 | 55.7 | −4.29 | −1.2468 |
| S14 | Aspherical | 6.4012 | 8.2700 | | | | −0.0863 |
| S15 | Spherical | Infinite | | | | | |

TABLE 10

| Surface number | A4 | A6 | A8 | A10 | A12 | A14 | A16 | A18 | A20 |
|---|---|---|---|---|---|---|---|---|---|
| S1 | 1.3955E−04 | 3.7241E−04 | −3.8045E−04 | 3.2205E−04 | −1.5282E−04 | 4.4349E−05 | −7.5944E−06 | 7.0921E−07 | −2.7227E−08 |
| S2 | −9.2303E−03 | 1.5575E−02 | −1.3120E−02 | 6.4512E−03 | −2.0101E−03 | 4.1371E−04 | −5.4914E−05 | 4.2698E−06 | −1.4738E−07 |
| S3 | −6.7811E−03 | 1.4698E−02 | −1.2132E−02 | 5.7926E−03 | −1.7845E−03 | 3.7123E−04 | −5.0792E−05 | 4.0819E−06 | −1.4680E−07 |
| S4 | 1.0326E−03 | 2.2499E−03 | −9.1031E−04 | −4.5781E−04 | 2.1917E−04 | −1.0115E−04 | 2.4943E−05 | −3.3990E−06 | 1.9398E−07 |
| S5 | −1.5546E−02 | 9.3289E−04 | −7.1713E−04 | 6.8118E−04 | −3.9621E−04 | 1.4569E−04 | −3.1846E−05 | 3.8672E−06 | −2.0491E−07 |
| S6 | −1.4658E−02 | 1.2645E−03 | −7.7035E−04 | 6.1734E−04 | −2.9866E−04 | 9.1365E−05 | −1.6884E−05 | 1.7323E−06 | −7.7753E−08 |
| S7 | −4.8976E−03 | 8.6079E−05 | −1.2355E−04 | 5.1707E−05 | −1.0370E−05 | 1.5150E−06 | −1.3900E−07 | 6.8136E−09 | −1.3654E−10 |
| S8 | −3.3769E−03 | −1.7476E−03 | 4.5634E−04 | −1.2176E−04 | 2.0996E−05 | −1.9374E−06 | 8.1086E−08 | −1.0575E−10 | −6.4516E−11 |
| S9 | 3.3822E−03 | −3.0679E−03 | 9.7204E−04 | −2.2023E−04 | 3.1340E−05 | −2.6893E−06 | 1.3062E−07 | −3.0828E−09 | 2.2409E−11 |
| S10 | −2.2949E−02 | 3.2616E−03 | −7.0504E−06 | −5.9439E−05 | 1.0490E−05 | −9.8965E−07 | 5.4369E−08 | −1.6125E−09 | 1.9820E−11 |
| S11 | −2.5393E−02 | 2.0686E−03 | −1.2023E−04 | 1.3009E−05 | −1.2570E−06 | 6.4184E−08 | −1.5602E−09 | 1.2931E−11 | 4.6526E−14 |
| S12 | 1.1377E−02 | −2.9793E−03 | 5.6616E−04 | −6.0695E−05 | 3.8991E−06 | −1.5581E−07 | 3.8142E−09 | −5.2454E−11 | 3.1053E−13 |
| S13 | 8.6880E−03 | −1.5021E−03 | 3.8499E−04 | −4.8565E−05 | 3.4292E−06 | −1.4685E−07 | 3.8290E−09 | −5.6383E−11 | 3.6180E−13 |
| S14 | −1.0463E−02 | 9.3585E−04 | −7.7254E−05 | 5.1623E−06 | −2.5797E−07 | 8.9868E−09 | −2.0180E−10 | 2.5841E−12 | −1.4247E−14 |

Figure 10A:
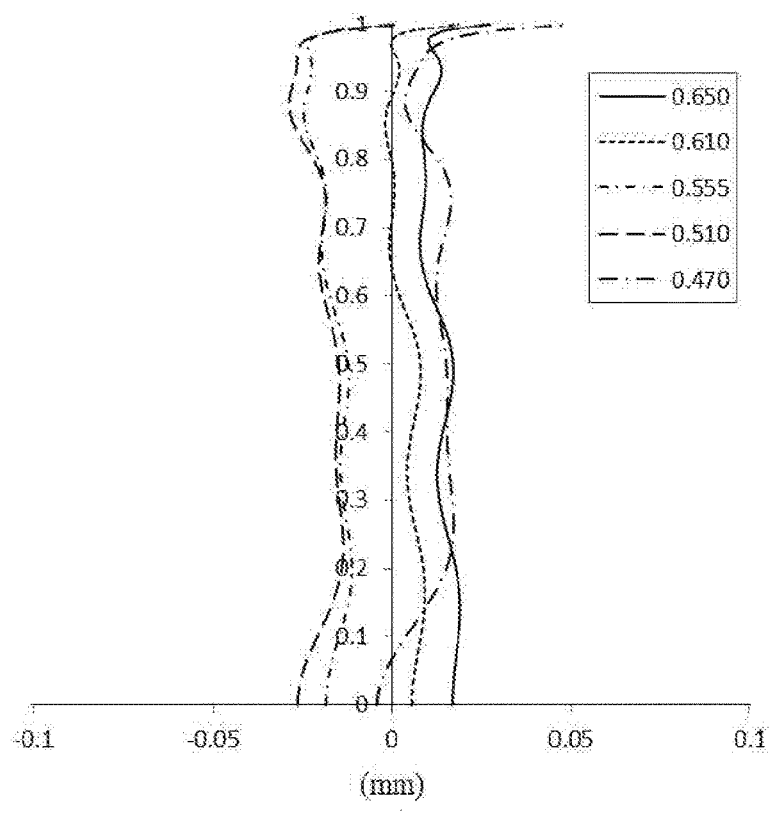
FIG. 10A to FIG. 10D illustrate a longitudinal aberration curve, astigmatism curve, distortion curve and lateral color curve of an optical imaging lens assembly according to embodiment 5 respectively.
Figure 10B:
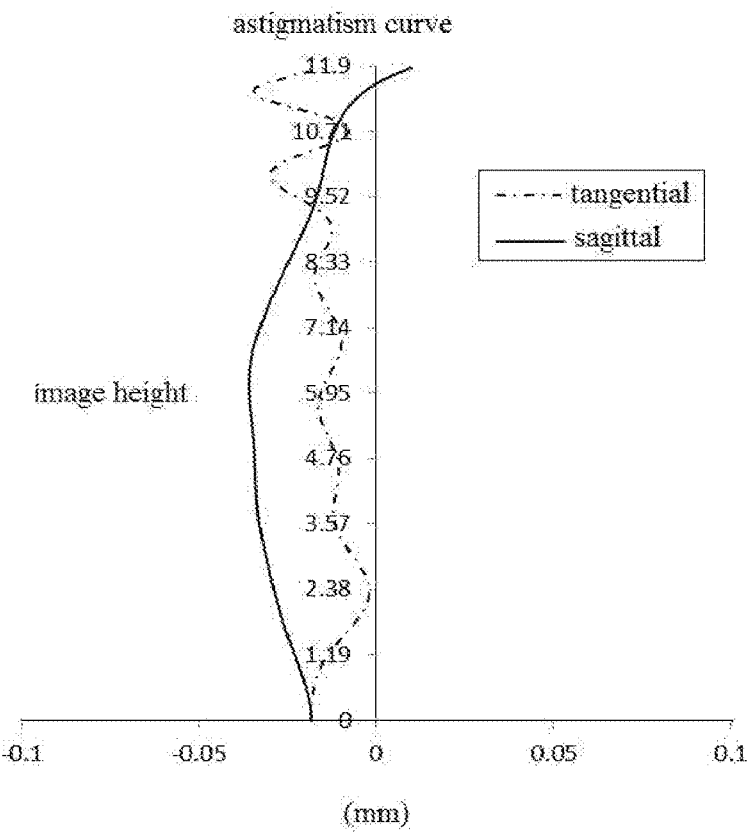
Figure 10C:
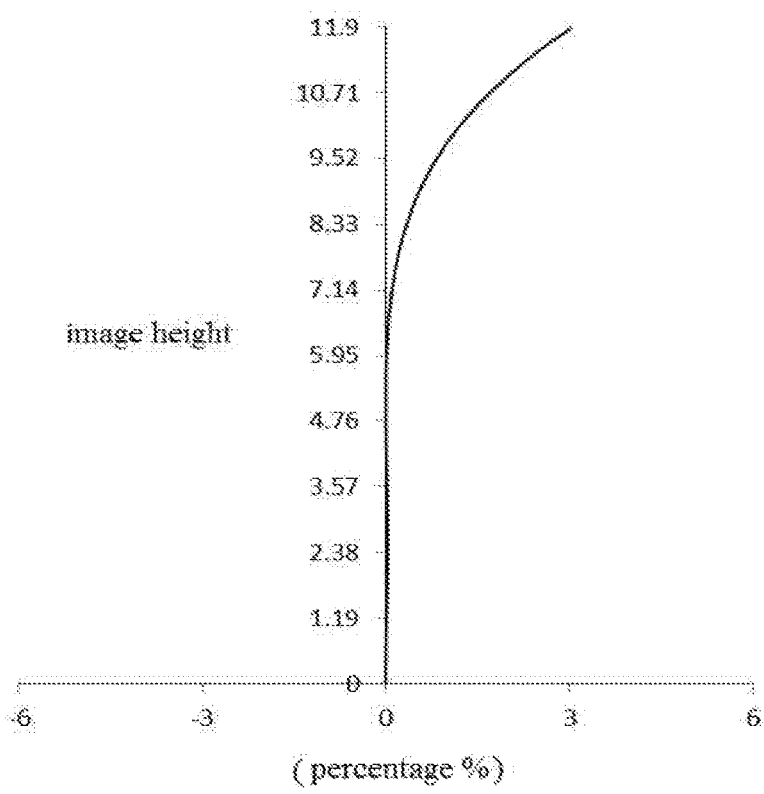
Figure 10D:
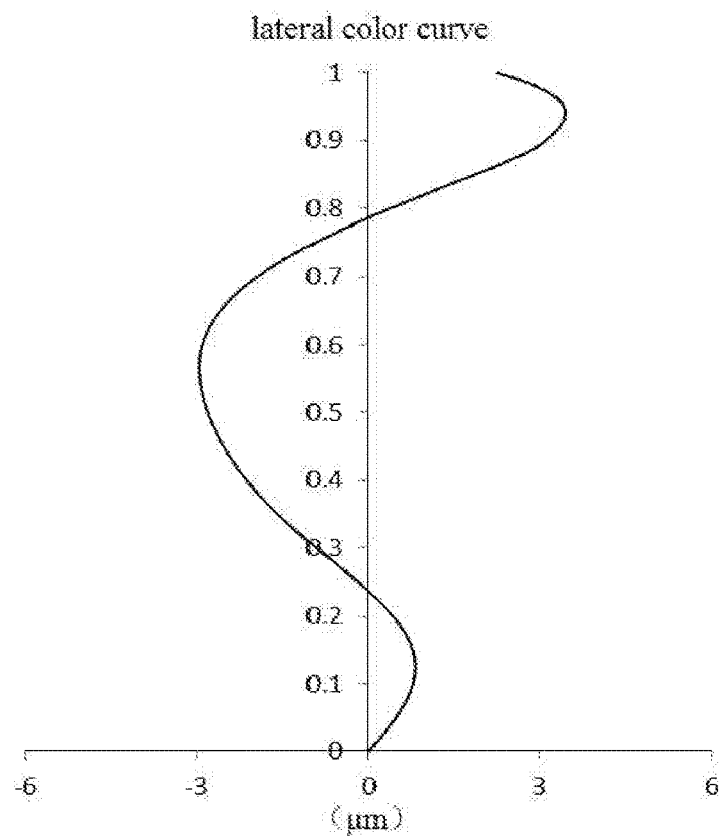

FIG. 10A illustrates a longitudinal aberration curve of the optical imaging lens assembly according to embodiment 5 to represent deviation of a convergence focal point after light with different wavelengths passes through the lens. FIG. 10B illustrates an astigmatism curve of the optical imaging lens assembly according to embodiment 5 to represent a tangential image surface curvature and a sagittal image surface curvature. FIG. 10C illustrates a distortion curve of the optical imaging lens assembly according to embodiment 5 to represent distortion values corresponding to different image heights. FIG. 10D illustrates a lateral color curve of the optical imaging lens assembly according to embodiment 5 to represent deviation of different image heights on the imaging surface after the light passes through the lens. According to FIG. 10A to FIG. 10D, it can be seen that the optical imaging lens assembly provided in embodiment 5 achieves high imaging quality.

Embodiment 6

Figure 11:
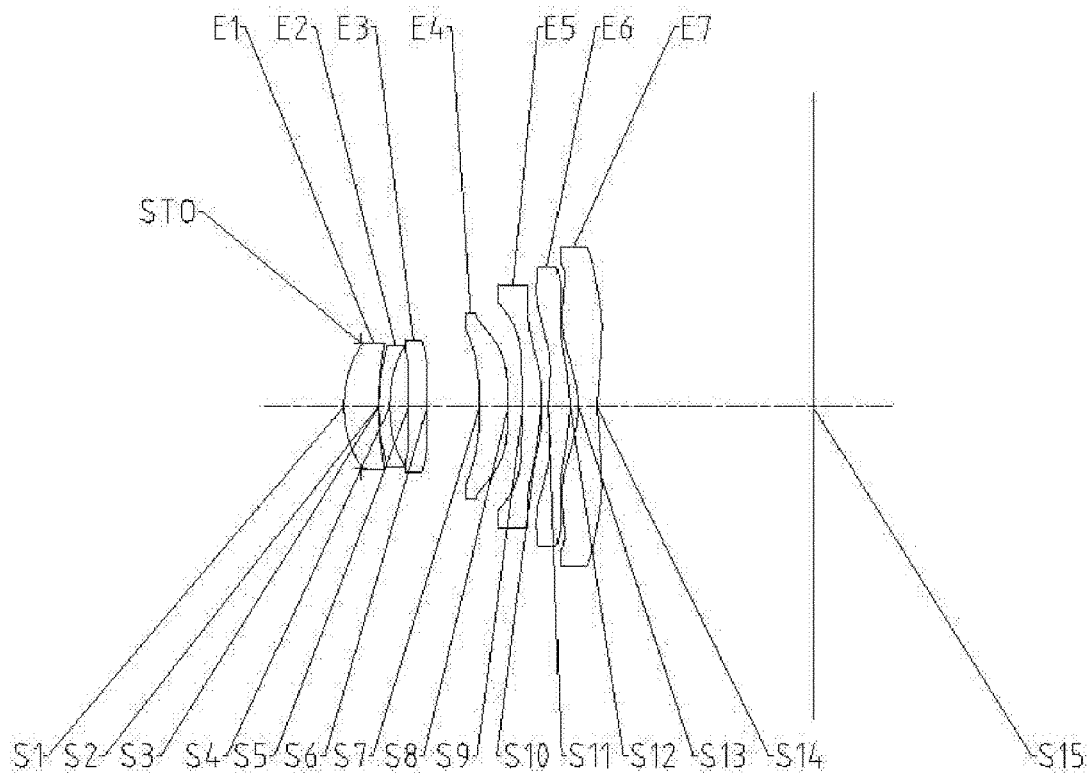
FIG. 11 is a structure diagram of an optical imaging lens assembly according to embodiment 6 of the disclosure.

The optical imaging lens assembly according to embodiment 6 of the disclosure will be described below with reference to FIG. 11 to FIG. 12D. FIG. 11 is a structure diagram of the optical imaging lens assembly according to embodiment 6 of the disclosure.

As shown in FIG. 11, from an object side to an image side along an optical axis, an optical imaging lens assembly sequentially includes: a diaphragm STO, a first lens E1, a second lens E2, a third lens E3, a fourth lens E4, a fifth lens E5, a sixth lens E6 and a seventh lens E7.

The first lens E1 has a positive refractive power, an object-side surface S1 thereof is a convex surface, and an image-side surface S2 is a concave surface. The second lens E2 has a negative refractive power, an object-side surface S3 thereof is a convex surface, and an image-side surface S4 is a concave surface. The third lens E3 has a positive refractive power, an object-side surface S5 thereof is a convex surface, and an image-side surface S6 is a concave surface. The fourth element E4 has a positive refractive power, an object-side surface S7 thereof is a concave surface, and an image-side surface S8 is a convex surface. The fifth lens E5 has a positive refractive power, an object-side surface S9 thereof is a concave surface, and an image-side surface S10 is a convex surface. The sixth lens E6 has a positive refractive power, an object-side surface S11 thereof is a convex surface, and an image-side surface S12 is a convex surface. The seventh lens E7 has a negative refractive power, an object-side surface S13 thereof is a concave surface, and an image-side surface S14 is a concave surface. The optical imaging lens assembly is provided with an imaging surface S15. Light from an object sequentially penetrates through each of the surfaces S1 to S14 and is finally imaged on the imaging surface S15.

In the embodiment 6, a total effective focal length f of the optical imaging lens assembly is 17.21 mm, an axial distance TTL from the object-side surface 51 of the first lens E1 to the imaging surface S15 is 18.08 mm, and a half of the diagonal length ImgH in an effective pixel region on the imaging surface S15 is 11.88 mm.

Table 11 shows basic parameters of the optical imaging lens assembly of embodiment 6, in which the units of radius of curvature, thickness/distance and focal length are millimeter (mm). Table 12 shows high-order coefficients applied to each aspherical mirror surface in embodiment 6. A surface type of each aspherical surface can be defined by formula (1) given in embodiment 1.

TABLE 11

| Surface number | Surface type | Radius of curvature | Thickness/ distance | Refractive index | Abbe number | Focal length | Conic coefficient |
|---|---|---|---|---|---|---|---|
| OBJ | Spherical | Infinite | Infinite | | | | |
| STO | Spherical | Infinite | −0.7331 | | | | |
| S1 | Aspherical | 4.4188 | 1.3320 | 1.55 | 56.1 | 11.91 | −0.0336 |
| S2 | Aspherical | 12.3296 | 0.0211 | | | | 0.7624 |
| S3 | Aspherical | 10.4557 | 0.4247 | 1.67 | 20.4 | −20.12 | 3.6407 |
| S4 | Aspherical | 5.7768 | 0.7255 | | | | −0.0542 |
| S5 | Aspherical | 27.4750 | 0.7222 | 1.67 | 20.4 | 250.22 | 90.7813 |
| S6 | Aspherical | 32.5561 | 2.0248 | | | | 96.4312 |
| S7 | Aspherical | −16.1196 | 1.0981 | 1.55 | 56.1 | 409.38 | 18.7432 |
| S8 | Aspherical | −15.3968 | 0.5667 | | | | 5.3511 |
| S9 | Aspherical | −29.0056 | 0.7267 | 1.55 | 56.1 | 376.96 | −90.3559 |
| S10 | Aspherical | −25.6474 | 0.2495 | | | | −99.0000 |
| S11 | Aspherical | 5.9292 | 0.8315 | 1.55 | 56.1 | 5.20 | −0.4124 |
| S12 | Aspherical | −5.1798 | 0.3082 | | | | −3.8646 |
| S13 | Aspherical | −3.9159 | 0.7136 | 1.54 | 55.7 | −4.58 | −1.1420 |
| S14 | Aspherical | 7.0339 | 8.3334 | | | | −0.0147 |
| S15 | Spherical | Infinite | | | | | |

TABLE 12

| Surface number | A4 | A6 | A8 | A10 | A12 | A14 | A16 | A18 | A20 |
|---|---|---|---|---|---|---|---|---|---|
| S1 | 2.9973E−04 | 1.9007E−04 | −1.7048E−04 | 1.2537E−04 | −5.2720E−05 | 1.3684E−05 | −2.1339E−06 | 1.8446E−07 | −6.7753E−09 |
| S2 | −4.7203E−03 | 7.5723E−03 | −5.3085E−03 | 1.9279E−03 | −3.7517E−04 | 3.2541E−05 | 8.6783E−07 | −3.8847E−07 | 2.0915E−08 |
| S3 | −2.9550E−03 | 7.4480E−03 | −5.0828E−03 | 1.8840E−03 | −4.0865E−04 | 5.2880E−05 | −3.8598E−06 | 1.3421E−07 | −2.1703E−09 |
| S4 | 3.5141E−04 | 1.6387E−03 | −5.4792E−04 | 8.1114E−05 | 2.3806E−05 | −1.2790E−05 | 2.7406E−06 | −3.0687E−07 | 1.4089E−08 |
| S5 | −1.2005E−02 | 2.9767E−04 | 8.0695E−06 | −1.2709E−05 | −1.3300E−06 | 2.7770E−06 | −6.2700E−07 | 4.8941E−08 | −1.4342E−09 |
| S6 | −1.0250E−02 | 4.7845E−04 | −1.3536E−04 | 1.0505E−04 | −4.9152E−05 | 1.4119E−05 | −2.3598E−06 | 2.0891E−07 | −7.7932E−09 |
| S7 | −5.1034E−03 | 6.3543E−04 | −2.8019E−04 | 8.5568E−05 | −1.7113E−05 | 2.3534E−06 | −1.9502E−07 | 8.6320E−09 | −1.5728E−10 |
| S8 | −7.4986E−03 | 1.7628E−04 | −1.9866E−04 | 4.9205E−05 | −7.8484E−06 | 1.0048E−06 | −8.8874E−08 | 4.6574E−09 | −1.0573E−10 |

TABLE 12-continued

| Surface number | A4 | A6 | A8 | A10 | A12 | A14 | A16 | A18 | A20 |
|---|---|---|---|---|---|---|---|---|---|
| S9 | 1.9958E−03 | −1.0009E−03 | 7.5915E−05 | 1.2680E−05 | −5.4231E−06 | 8.4439E−07 | −6.9375E−08 | 2.9478E−09 | −5.0749E−11 |
| S10 | −2.2012E−02 | 4.0304E−03 | −4.2093E−04 | 3.9633E−05 | −3.2703E−06 | 1.8354E−07 | −5.9805E−09 | 9.8117E−11 | −5.8413E−13 |
| S11 | −2.5930E−02 | 2.1932E−03 | −1.4914E−04 | 1.8733E−05 | −1.9854E−06 | 1.2001E−07 | −4.0367E−09 | 7.1273E−11 | −5.1679E−13 |
| S12 | 1.1415E−02 | −3.1059E−03 | 5.9985E−04 | −6.5789E−05 | 4.3638E−06 | −1.8256E−07 | 4.7682E−09 | −7.1626E−11 | 4.7527E−13 |
| S13 | 8.3600E−03 | −1.3969E−03 | 3.3980E−04 | −4.0812E−05 | 2.7127E−06 | −1.0776E−07 | 2.5639E−09 | −3.3816E−11 | 1.8982E−13 |
| S14 | −1.0393E−02 | 8.8533E−04 | −6.9968E−05 | 4.4834E−06 | −2.1758E−07 | 7.4167E−09 | −1.6200E−10 | 1.9932E−12 | −1.0429E−14 |

Figure 12A:
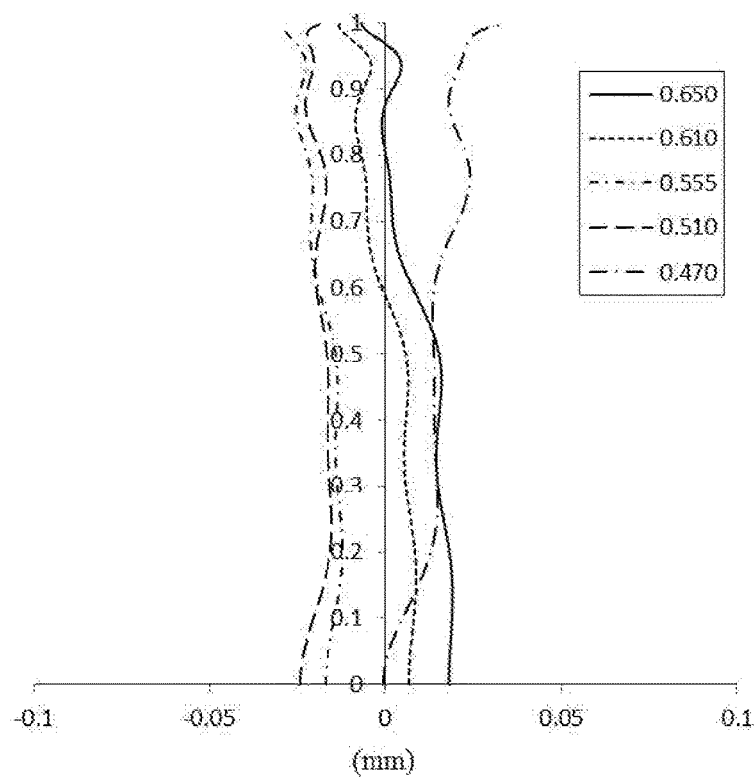
FIG. 12A to FIG. 12D illustrate a longitudinal aberration curve, astigmatism curve, distortion curve and lateral color curve of an optical imaging lens assembly according to embodiment 6 respectively.
Figure 12B:
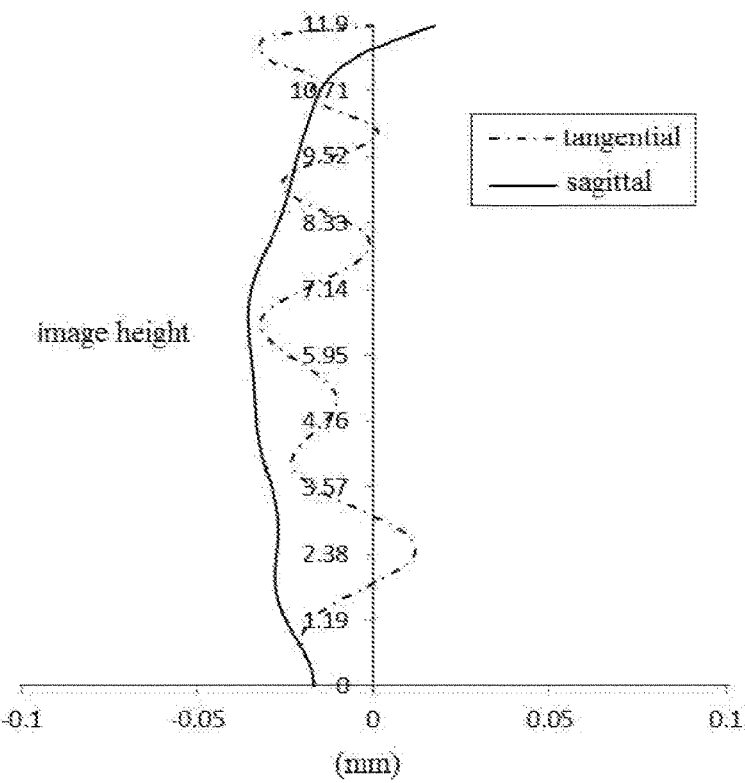
Figure 12C:
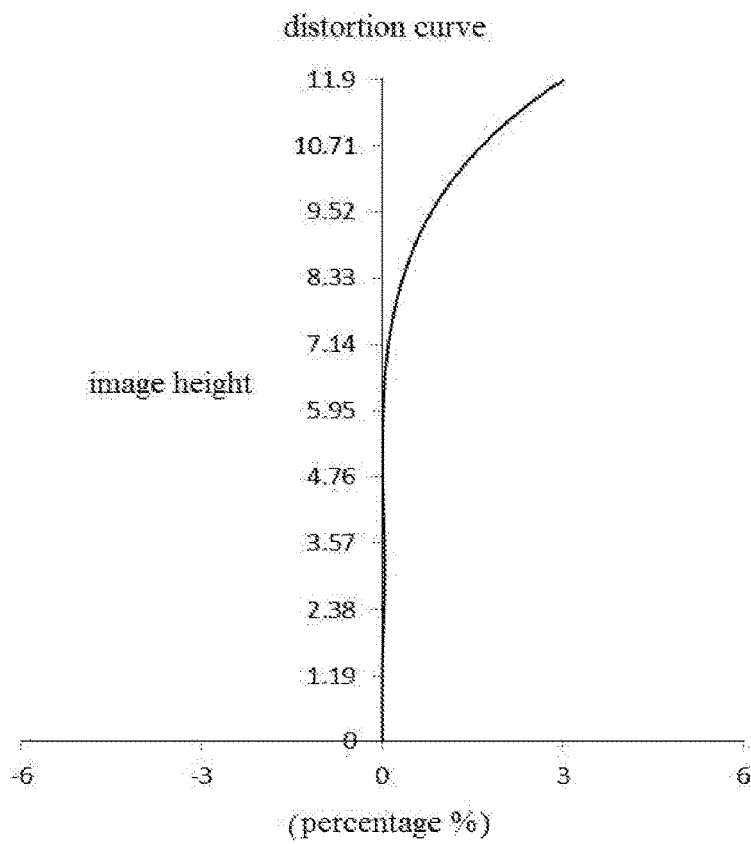
Figure 12D:
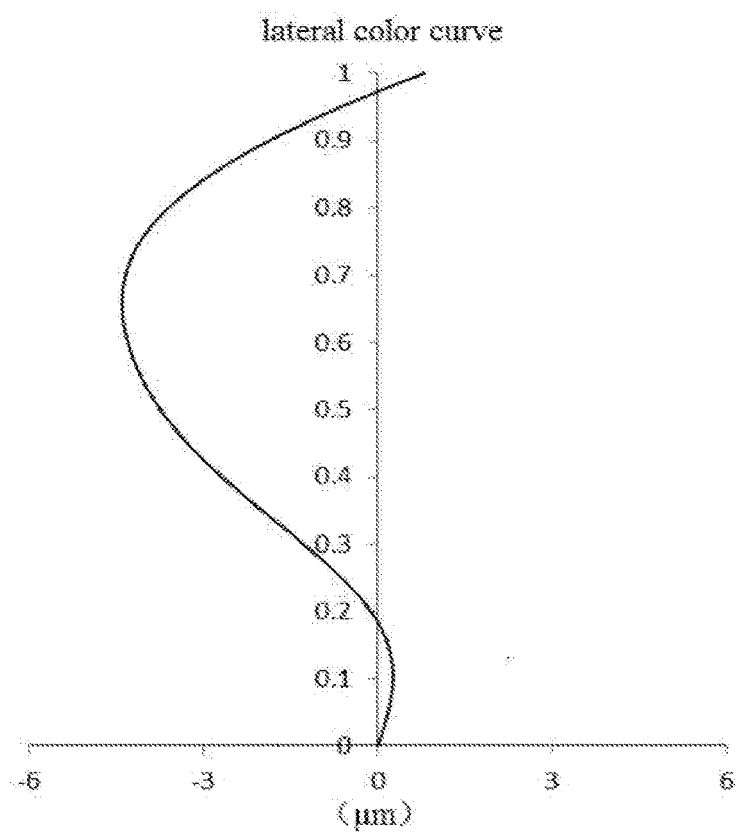

FIG. 12A illustrates a longitudinal aberration curve of the optical imaging lens assembly according to embodiment 6 to represent deviation of a convergence focal point after light with different wavelengths passes through the lens. FIG. 12B illustrates an astigmatism curve of the optical imaging lens assembly according to embodiment 6 to represent a tangential image surface curvature and a sagittal image surface curvature. FIG. 12C illustrates a distortion curve of the optical imaging lens assembly according to embodiment 6 to represent distortion values corresponding to different image heights. FIG. 12D illustrates a lateral color curve of the optical imaging lens assembly according to embodiment 6 to represent deviation of different image heights on the imaging surface after the light passes through the lens. According to FIG. 12A to FIG. 12D, it can be seen that the optical imaging lens assembly provided in embodiment 6 achieves high imaging quality.

Embodiment 7

Figure 13:
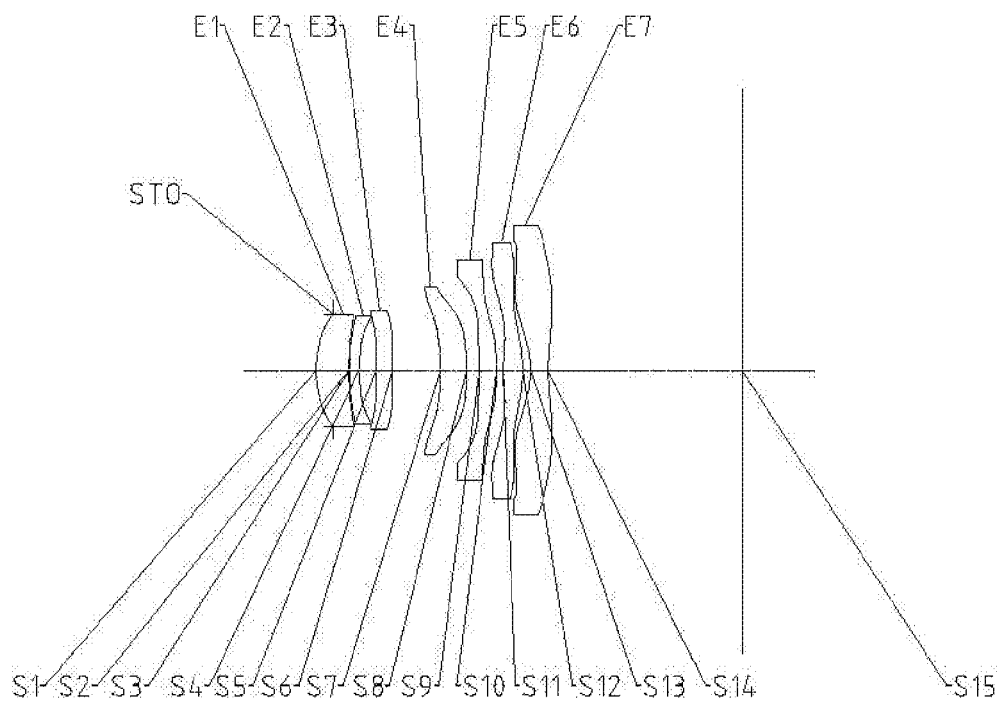
FIG. 13 is a structure diagram of an optical imaging lens assembly according to embodiment 7 of the disclosure.

The optical imaging lens assembly according to embodiment 7 of the disclosure will be described below with reference to FIG. 13 to FIG. 14D. FIG. 13 is a structure diagram of the optical imaging lens assembly according to embodiment 7 of the disclosure.

As shown in FIG. 13, from an object side to an image side along an optical axis, an optical imaging lens assembly sequentially includes: a diaphragm STO, a first lens E1, a second lens E2, a third lens E3, a fourth lens E4, a fifth lens E5, a sixth lens E6 and a seventh lens E7.

The first lens E1 has a positive refractive power, an object-side surface S1 thereof is a convex surface, and an image-side surface S2 is a concave surface. The second lens E2 has a negative refractive power, an object-side surface S3 thereof is a convex surface, and an image-side surface S4 is a concave surface. The third lens E3 has a positive refractive power, an object-side surface S5 thereof is a convex surface, and an image-side surface S6 is a concave surface. The fourth lens E4 has a negative refractive power, an object-side surface S7 thereof is a concave surface, and an image-side surface S8 is a convex surface. The fifth lens E5 has a positive refractive power, an object-side surface S9 thereof is a concave surface, and an image-side surface S10 is a convex surface. The sixth lens E6 has a positive refractive power, an object-side surface S11 thereof is a convex surface, and an image-side surface S12 is a convex surface. The seventh lens E7 has a negative refractive power, an object-side surface S13 thereof is a concave surface, and an image-side surface S14 is a concave surface. The optical imaging lens assembly is provided with an imaging surface S15. Light from an object sequentially penetrates through each of the surfaces S1 to S14 and is finally imaged on the imaging surface S15.

In the embodiment 7, a total effective focal length f of the optical imaging lens assembly is 16.99 mm, an axial distance TTL from the object-side surface S1 of the first lens E1 to the imaging surface S15 is 17.89 mm, and a half of the diagonal length ImgH in the effective pixel region on the imaging surface S15 is 11.88 mm.

Table 13 shows basic parameters of the optical imaging lens assembly of embodiment 7, in which the units of radius of curvature, thickness/distance and focal length are millimeter (mm). Table 14 shows high-order coefficients applied to each aspherical mirror surface in embodiment 7. A surface type of each aspherical surface can be defined by formula (1) given in embodiment 1.

TABLE 13

| Surface number | Surface type | Radius of curvature | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7105 | | | | |
| S1 | Aspherical | 4.4177 | 1.3711 | 1.55 | 56.1 | 11.74 | −0.0267 |
| S2 | Aspherical | 12.6688 | 0.0200 | | | | 0.2337 |
| S3 | Aspherical | 11.5158 | 0.4185 | 1.67 | 20.4 | −21.05 | 4.3167 |
| S4 | Aspherical | 6.2295 | 0.7118 | | | | −0.1363 |
| S5 | Aspherical | 37.5579 | 0.7043 | 1.67 | 20.4 | 487.77 | 93.9629 |
| S6 | Aspherical | 42.1518 | 1.9990 | | | | 99.0000 |
| S7 | Aspherical | −15.0723 | 1.0972 | 1.55 | 56.1 | −499.99 | 18.0215 |
| S8 | Aspherical | −16.3632 | 0.5333 | | | | 8.5806 |
| S9 | Aspherical | −34.0531 | 0.7346 | 1.55 | 56.1 | 499.99 | −67.4628 |
| S10 | Aspherical | −30.5068 | 0.2571 | | | | −44.5064 |
| S11 | Aspherical | 5.8429 | 0.8424 | 1.55 | 56.1 | 5.12 | −0.4417 |
| S12 | Aspherical | −5.0798 | 0.3261 | | | | −3.8824 |
| S13 | Aspherical | −3.8672 | 0.7184 | 1.54 | 55.7 | −4.59 | −1.1500 |
| S14 | Aspherical | 7.2140 | 8.1530 | | | | −0.0075 |
| S15 | Spherical | Infinite | | | | | |

TABLE 14

| Surface number | A4 | A6 | A8 | A10 | A12 | A14 | A16 | A18 | A20 |
|---|---|---|---|---|---|---|---|---|---|
| S1 | 3.2234E−04 | 2.2646E−04 | −2.1047E−04 | 1.4842E−04 | −6.0578E−05 | 1.5261E−05 | −2.3179E−06 | 1.9580E−07 | −7.0724E−09 |
| S2 | −4.6649E−03 | 7.1120E−03 | −4.4675E−03 | 1.1487E−03 | 4.1871E−05 | −1.0177E−04 | 2.6644E−05 | −3.1051E−06 | 1.4130E−07 |
| S3 | −2.8374E−03 | 7.0889E−03 | −4.4482E−03 | 1.2908E−03 | −8.2459E−05 | −5.4700E−05 | 1.7228E−05 | −2.1253E−06 | 9.9025E−08 |
| S4 | 4.1439E−04 | 1.5637E−03 | −5.1053E−04 | 2.0026E−05 | 7.6052E−05 | −3.5912E−05 | 8.3163E−06 | −9.9652E−07 | 4.8460E−08 |
| S5 | −1.1948E−02 | 2.3844E−04 | 1.1280E−04 | −1.0851E−04 | 5.0962E−05 | −1.4997E−05 | 3.0440E−06 | −3.7319E−07 | 1.9506E−08 |
| S6 | −1.0156E−02 | 5.0635E−04 | −1.3352E−04 | 1.0816E−04 | −5.2188E−05 | 1.5387E−05 | −2.6298E−06 | 2.3835E−07 | −9.1083E−09 |
| S7 | −5.2070E−03 | 5.5124E−04 | −2.1375E−04 | 6.0377E−05 | −1.1058E−05 | 1.4533E−06 | −1.1446E−07 | 4.6478E−09 | −7.3593E−11 |
| S8 | −7.2754E−03 | −9.0690E−05 | −9.8068E−05 | 2.3539E−05 | −3.6659E−06 | 6.0369E−07 | −6.8837E−08 | 4.3174E−09 | −1.1039E−10 |
| S9 | 2.3256E−03 | −1.2003E−03 | 1.5957E−04 | −1.0402E−05 | −1.4348E−06 | 4.1883E−07 | −4.2270E−08 | 2.0067E−09 | −3.7070E−11 |
| S10 | −2.2255E−02 | 4.0884E−03 | −4.2929E−04 | 4.0708E−05 | −3.3923E−06 | 1.9298E−07 | −6.4152E−09 | 1.0885E−10 | −6.9288E−13 |
| S11 | −2.5940E−02 | 2.1914E−03 | −1.4990E−04 | 1.8931E−05 | −2.0107E−06 | 1.2196E−07 | −4.1261E−09 | 7.3469E−11 | −5.3885E−13 |
| S12 | 1.1417E−02 | −3.1022E−03 | 5.9914E−04 | −6.5690E−05 | 4.3536E−06 | −1.8182E−07 | 4.7341E−09 | −7.0758E−11 | 4.6603E−13 |
| S13 | 8.3331E−03 | −1.3893E−03 | 3.3432E−04 | −3.9768E−05 | 2.6191E−06 | −1.0312E−07 | 2.4324E−09 | −3.1803E−11 | 1.7691E−13 |
| S14 | −1.0044E−02 | 8.4292E−04 | −6.5596E−05 | 4.1198E−06 | −1.9474E−07 | 6.4317E−09 | −1.3560E−10 | 1.6057E−12 | −8.0632E−15 |

Figure 14A:
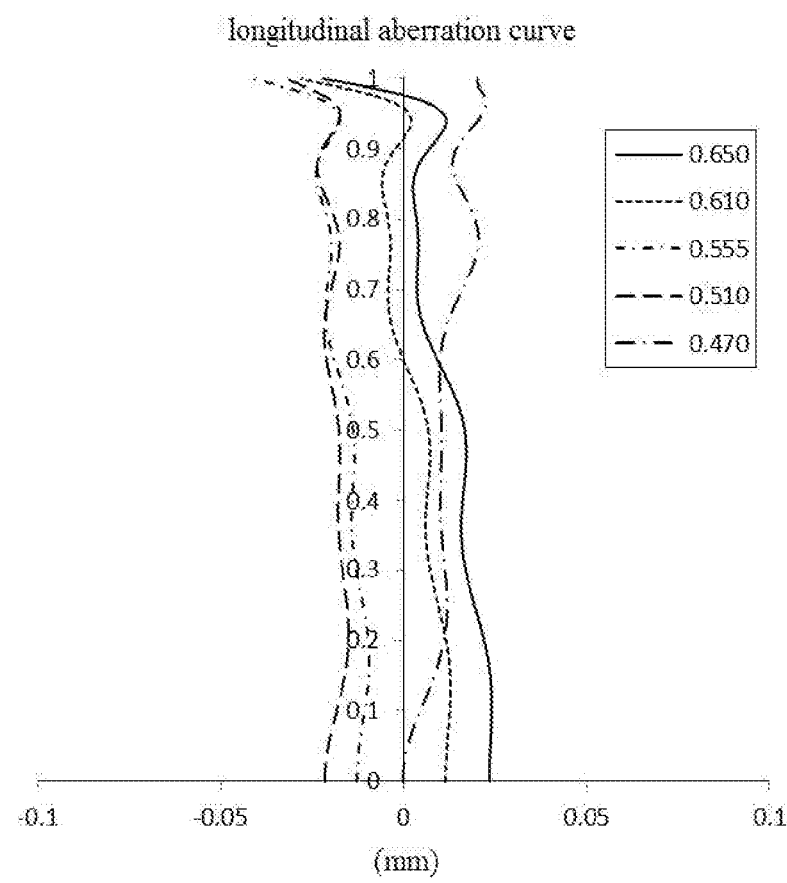
FIG. 14A to FIG. 14D illustrate a longitudinal aberration curve, astigmatism curve, distortion curve and lateral color curve of an optical imaging lens assembly according to embodiment 7 respectively.
Figure 14B:
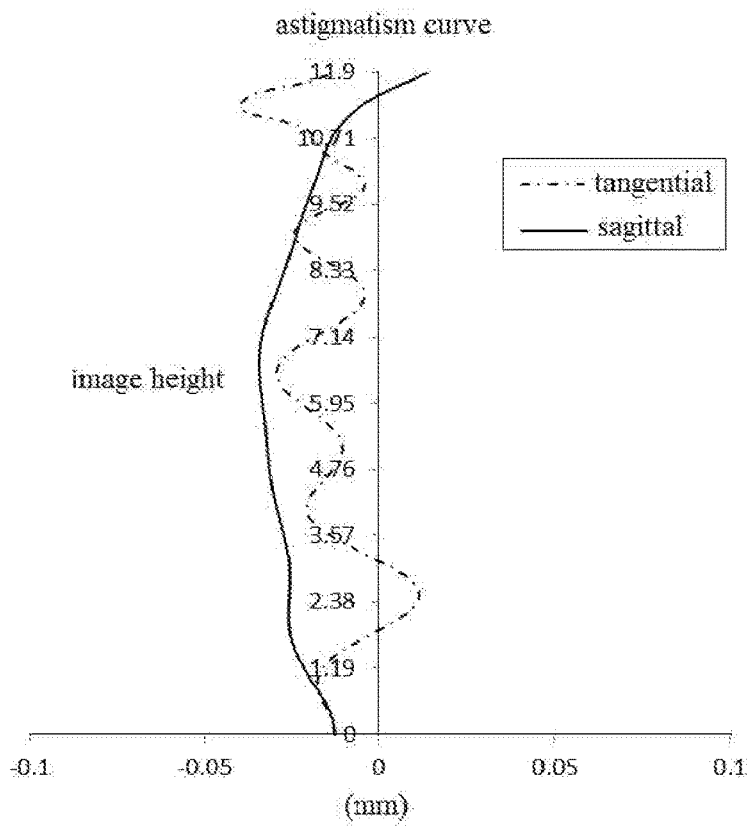
Figure 14C:
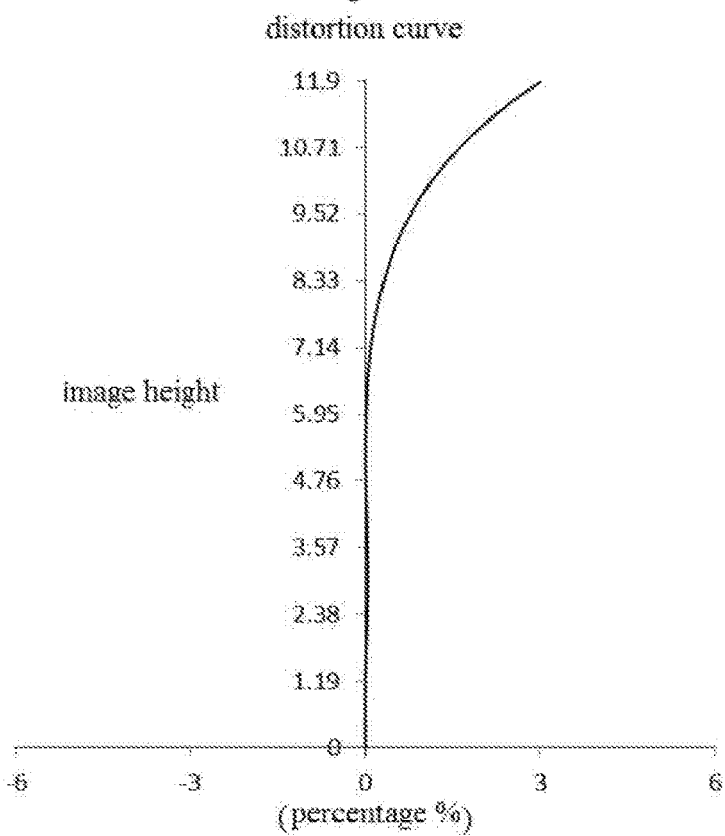
Figure 14D:
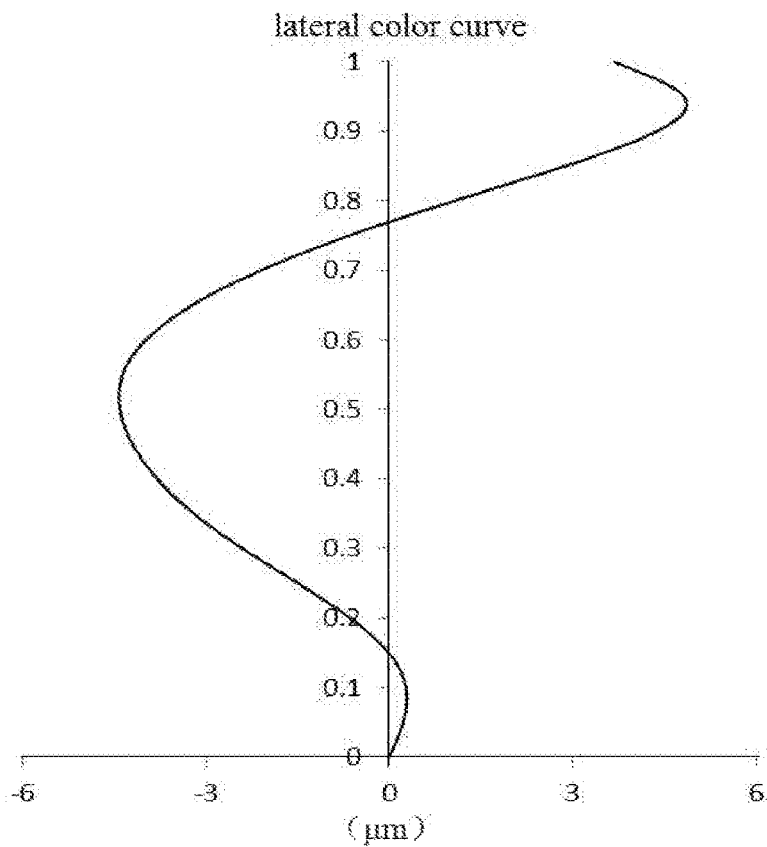

FIG. 14A illustrates a longitudinal aberration curve of the optical imaging lens assembly according to embodiment 7 to represent deviation of a convergence focal point after light with different wavelengths passes through the lens. FIG. 14B illustrates an astigmatism curve of the optical imaging lens assembly according to embodiment 7 to represent a tangential image surface curvature and a sagittal image surface curvature. FIG. 14C illustrates a distortion curve of the optical imaging lens assembly according to embodiment 7 to represent distortion values corresponding to different image heights. FIG. 14D illustrates a lateral color curve of the optical imaging lens assembly according to embodiment 7 to represent deviation of different image heights on the imaging surface after the light passes through the lens. According to FIG. 14A to FIG. 14D, it can be seen that the optical imaging lens assembly provided in embodiment 7 achieves high imaging quality.

Embodiment 8

Figure 15:
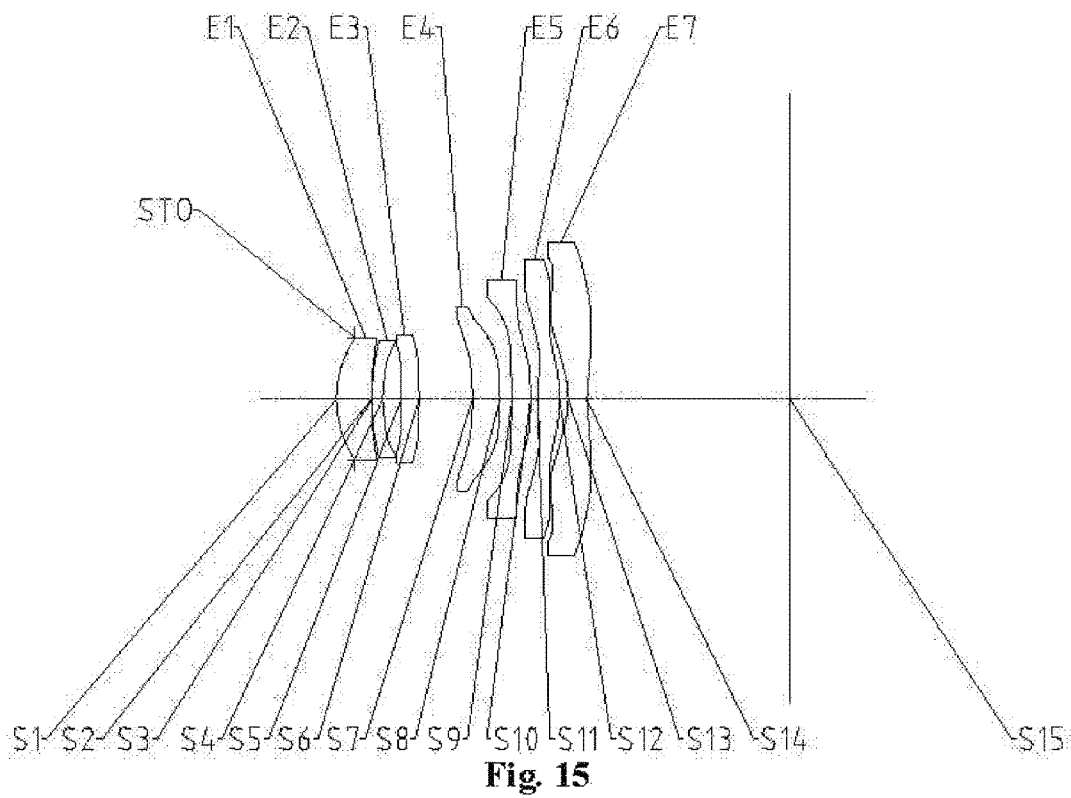
FIG. 15 is a structure diagram of an optical imaging lens assembly according to embodiment 8 of the disclosure.

The optical imaging lens assembly according to embodiment 8 of the disclosure will be described below with reference to FIG. 15 to FIG. 16D. FIG. 15 is a structure diagram of the optical imaging lens assembly according to embodiment 8 of the disclosure.

As shown in FIG. 15, from an object side to an image side along an optical axis, an optical imaging lens assembly sequentially includes: a diaphragm STO, a first lens E1, a second lens E2, a third lens E3, a fourth lens E4, a fifth lens E5, a sixth lens E6 and a seventh lens E7.

The first lens E1 has a positive refractive power, an object-side surface S1 thereof is a convex surface, and an image-side surface S2 is a concave surface. The second lens E2 has a negative refractive power, an object-side surface S3 thereof is a convex surface, and an image-side surface S4 is a concave surface. The third lens E3 has a positive refractive power, an object-side surface S5 thereof is a convex surface, and an image-side surface S6 is a concave surface. The fourth lens E4 has a negative refractive power, an object-side surface S7 thereof is a concave surface, and an image-side surface S8 is a convex surface. The fifth lens E5 has a negative refractive power, an object-side surface S9 thereof is a concave surface, and an image-side surface S10 is a convex surface. The sixth lens E6 has a positive refractive power, an object-side surface S11 thereof is a convex surface, and an image-side surface S12 is a convex surface. The seventh lens E7 has a negative refractive power, an object-side surface S13 thereof is a concave surface, and an image-side surface S14 is a concave surface. The optical imaging lens assembly is provided with an imaging surface S15. Light from an object sequentially penetrates through each of the surfaces S1 to S14 and is finally imaged on the imaging surface S15.

In the embodiment 8, a total effective focal length f of the optical imaging lens assembly is 17.04 mm, an axial distance TTL from the object-side surface S1 of the first lens E1 to the imaging surface S15 is 17.80 mm, and a half of the diagonal length ImgH in an effective pixel region on the imaging surface S15 is 11.88 mm.

Table 15 shows basic parameters of the optical imaging lens assembly of embodiment 8, in which the units of radius of curvature, thickness/distance and focal length are millimeter (mm). Table 16 shows high-order coefficients applied to each aspherical mirror surface in embodiment 8. A surface type of each aspherical surface can be defined by formula (1) given in embodiment 1.

TABLE 15

| Surface number | Surface type | Radius of curvature | Thickness/ distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −0.7262 | | | | |
| S1 | Aspherical | 4.3580 | 1.3683 | 1.55 | 56.1 | 11.37 | −0.0277 |
| S2 | Aspherical | 13.0096 | 0.0252 | | | | 1.3231 |
| S3 | Aspherical | 12.1405 | 0.4189 | 1.67 | 20.4 | −20.32 | 5.6009 |
| S4 | Aspherical | 6.3102 | 0.7337 | | | | 0.0409 |
| S5 | Aspherical | 81.7661 | 0.6965 | 1.67 | 20.4 | 300.32 | 98.2410 |
| S6 | Aspherical | 137.8732 | 2.1084 | | | | −92.3490 |
| S7 | Aspherical | −15.2397 | 1.0655 | 1.55 | 56.1 | −299.99 | 17.3599 |
| S8 | Aspherical | −17.2181 | 0.4865 | | | | 8.4121 |
| S9 | Aspherical | −32.0451 | 0.7281 | 1.55 | 56.1 | −299.99 | −70.9515 |

TABLE 15-continued

| Surface number | Surface type | Radius of curvature | Thickness/ distance | Material Refractive index | Abbe number | Focal length | Conic coefficient |
|---|---|---|---|---|---|---|---|
| S10 | Aspherical | −40.1599 | 0.2580 | | | | 1.2360 |
| S11 | Aspherical | 5.8316 | 0.8526 | 1.55 | 56.1 | 5.08 | −0.4813 |
| S12 | Aspherical | −5.0149 | 0.3448 | | | | −3.8579 |
| S13 | Aspherical | −3.8197 | 0.7227 | 1.54 | 55.7 | −4.62 | −1.1601 |
| S14 | Aspherical | 7.5361 | 7.9925 | | | | −0.0009 |
| S15 | Spherical | Infinite | | | | | |

TABLE 16

| Surface number | A4 | A6 | A8 | A10 | A12 | A14 | A16 | A18 | A20 |
|---|---|---|---|---|---|---|---|---|---|
| S1 | 3.3470E−04 | 2.4729E−04 | −2.3758E−04 | 1.6414E−04 | −6.6212E−05 | 1.6496E−05 | −2.4788E−06 | 2.0717E−07 | −7.4000E−09 |
| S2 | −3.7409E−03 | 5.4110E−03 | −2.7733E−03 | 2.0658E−04 | 3.4352E−04 | −1.5657E−04 | 3.1745E−05 | −3.2680E−06 | 1.3824E−07 |
| S3 | −2.1292E−03 | 5.7312E−03 | −3.0112E−03 | 4.6034E−04 | 1.9813E−04 | −1.1066E−04 | 2.3614E−05 | −2.5102E−06 | 1.0903E−07 |
| S4 | 4.1540E−04 | 1.5754E−03 | −4.4999E−04 | −4.0339E−05 | 1.1113E−04 | −4.8393E−05 | 1.1135E−05 | −1.3634E−06 | 6.8703E−08 |
| S5 | −1.1730E−02 | 2.7963E−04 | 8.6526E−05 | −7.3471E−05 | 2.9844E−05 | −6.8622E−06 | 1.1729E−06 | −1.3168E−07 | 5.8419E−09 |
| S6 | −9.9122E−03 | 5.4744E−04 | −1.3991E−04 | 1.0778E−04 | −4.9676E−05 | 1.4262E−05 | −2.3882E−06 | 2.1228E−07 | −7.9963E−09 |
| S7 | −5.2061E−03 | 4.7541E−04 | −1.5181E−04 | 3.6287E−05 | −5.4473E−06 | 6.6307E−07 | −5.0899E−08 | 1.9850E−09 | −2.8817E−11 |
| S8 | −7.0879E−03 | −9.2038E−05 | −6.9039E−05 | 4.2813E−06 | 1.4623E−06 | −1.3804E−07 | −5.7180E−09 | 1.2762E−09 | −4.5975E−11 |
| S9 | 1.8163E−03 | −9.3748E−04 | 1.2185E−04 | −1.3274E−05 | 2.8954E−07 | 1.6536E−07 | −2.3717E−08 | 1.3108E−09 | −2.6346E−11 |
| S10 | −2.2818E−02 | 4.2283E−03 | −4.5103E−04 | 4.3805E−05 | −3.7680E−06 | 2.2365E−07 | −7.9150E−09 | 1.4846E−10 | −1.1266E−12 |
| S11 | −2.5526E−02 | 2.1328E−03 | −1.4545E−04 | 1.8305E−05 | −1.9301E−06 | 1.1629E−07 | −3.9130E−09 | 6.9382E−11 | −5.0724E−13 |
| S12 | 1.1390E−02 | −3.0739E−03 | 5.9240E−04 | −6.4839E−05 | 4.2901E−06 | −1.7882E−07 | 4.6438E−09 | −6.9136E−11 | 4.5254E−13 |
| S13 | 8.3901E−03 | −1.4249E−03 | 3.3728E−04 | −3.9646E−05 | 2.5917E−06 | −1.0164E−07 | 2.3965E−09 | −3.1437E−11 | 1.7620E−13 |
| S14 | −9.3100E−03 | 7.2886E−04 | −5.1442E−05 | 2.8555E−06 | −1.1777E−07 | 3.3684E−09 | −6.0238E−11 | 5.7442E−13 | −2.0791E−15 |

Figure 16A:
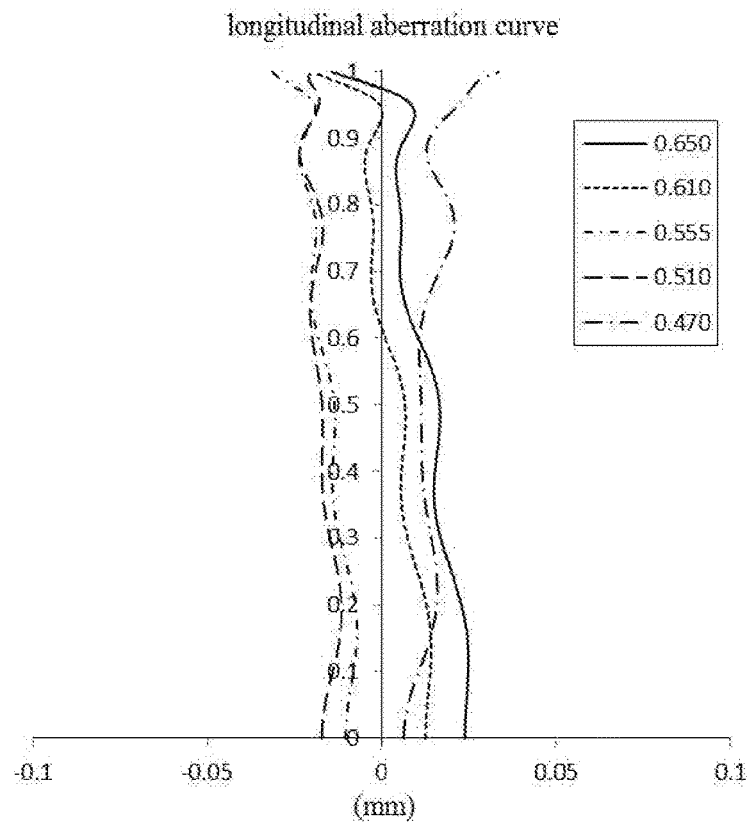
FIG. 16A to FIG. 16D illustrate a longitudinal aberration curve, astigmatism curve, distortion curve and lateral color curve of an optical imaging lens assembly according to embodiment 8 respectively.
Figure 16B:
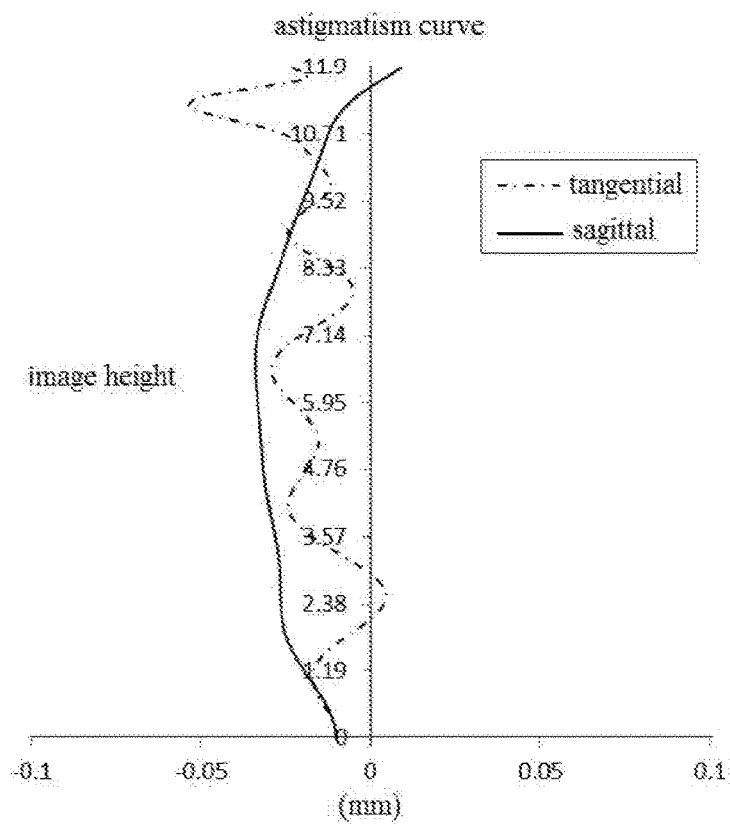
Figure 16C:
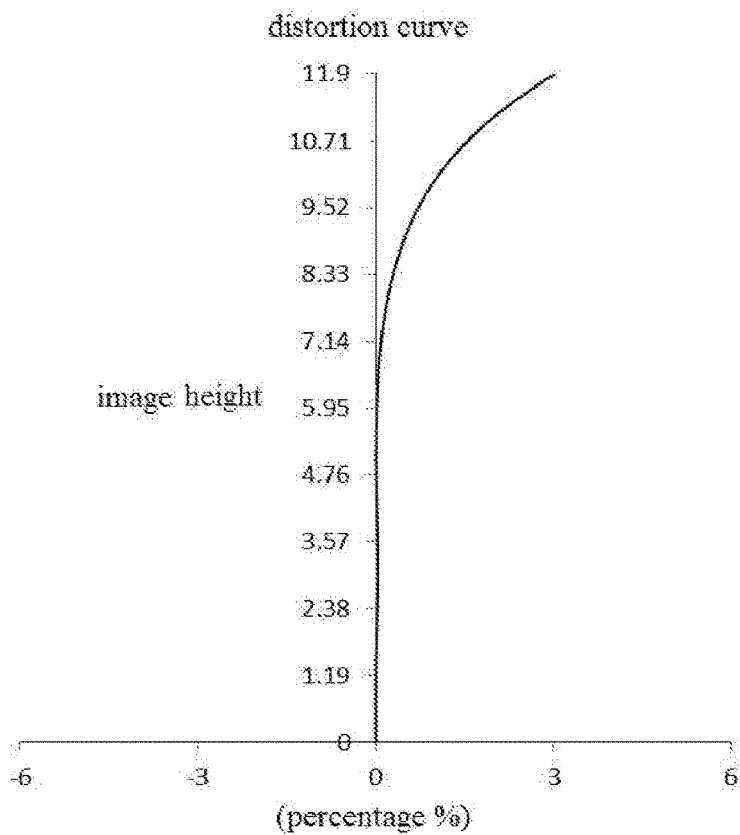
Figure 16D:
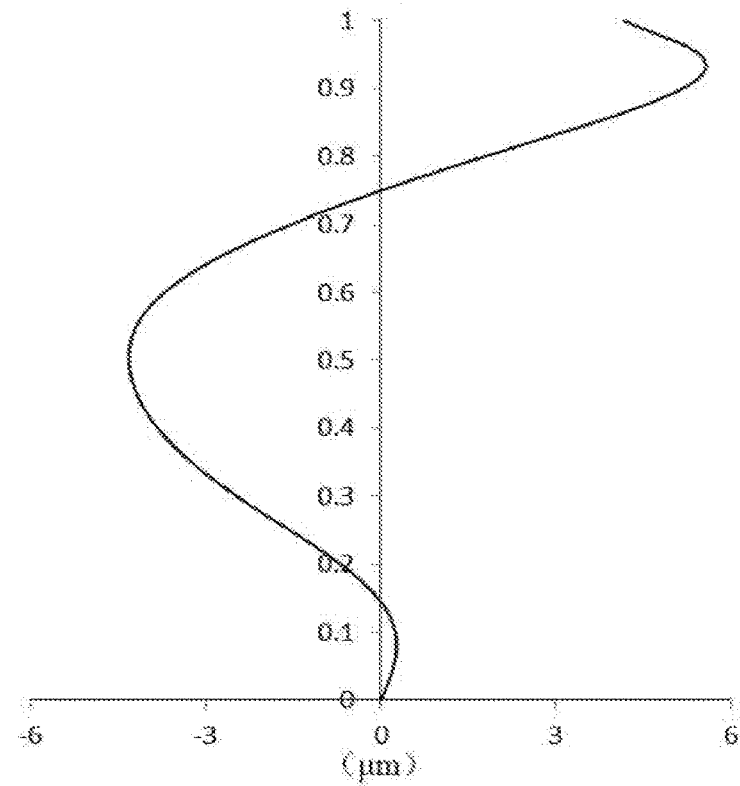

FIG. 16A illustrates a longitudinal aberration curve of the optical imaging lens assembly according to embodiment 8 to represent deviation of a convergence focal point after light with different wavelengths passes through the lens. FIG. 16B illustrates an astigmatism curve of the optical imaging lens assembly according to embodiment 8 to represent a tangential image surface curvature and a sagittal image surface curvature. FIG. 16C illustrates a distortion curve of the optical imaging lens assembly according to embodiment 8 to represent distortion values corresponding to different image heights. FIG. 16D illustrates a lateral color curve of the optical imaging lens assembly according to embodiment 8 to represent deviation of different image heights on the imaging surface after the light passes through the lens. According to FIG. 16A to FIG. 16D, it can be seen that the optical imaging lens assembly provided in embodiment 8 achieves high imaging quality.

To sum up, embodiment 1 to embodiment 8 satisfy the relationship shown in Table 17 respectively.

TABLE 17

| Conditional expressions\embodiments | 1 | 2 | 3 | 4 | 5 | 6 | 7 | 8 |
|---|---|---|---|---|---|---|---|---|
| FFL/TTL | 0.52 | 0.50 | 0.49 | 0.50 | 0.48 | 0.46 | 0.46 | 0.45 |
| f(mm) | 14.93 | 15.98 | 15.96 | 16.23 | 16.09 | 17.21 | 16.99 | 17.04 |
| f6/(R11 + R12) | 5.52 | 6.91 | 6.23 | 6.16 | 7.35 | 6.94 | 6.71 | 6.22 |
| f7/(R13 + R14) | −1.34 | −1.46 | −1.51 | −1.56 | −1.61 | −1.47 | −1.37 | −1.24 |
| f/(f1 − f2) | 0.45 | 0.48 | 0.49 | 0.48 | 0.48 | 0.54 | 0.52 | 0.54 |
| FOV (°) | 75.1 | 71.5 | 71.6 | 70.7 | 71.2 | 67.6 | 68.3 | 68.1 |
| R4/R3 | 0.73 | 0.70 | 0.69 | 0.68 | 0.67 | 0.55 | 0.54 | 0.52 |
| (T23 + CT3)/(T34) | 1.06 | 0.99 | 0.91 | 0.86 | 0.81 | 0.71 | 0.71 | 0.68 |
| f123/f4567 | 0.87 | 0.66 | 0.57 | 0.58 | 0.51 | 0.23 | 0.20 | 0.11 |
| (SAG21 + SAG22)/(CT2) | 3.56 | 3.71 | 3.60 | 3.56 | 3.31 | 2.02 | 1.89 | 1.87 |

TABLE 17-continued

| Conditional expressions\embodiments | 1 | 2 | 3 | 4 | 5 | 6 | 7 | 8 |
|---|---|---|---|---|---|---|---|---|
| (SAG61 + SAG 62)/(SAG 51 + SAG52) | 0.59 | 0.50 | 0.36 | 0.31 | 0.24 | 0.63 | 0.62 | 0.69 |

Some embodiments of the disclosure further provide an imaging apparatus, which includes an electronic photosensitive component for imaging. The electronic photosensitive component may be a Charge Coupled Device (CCD) or a Complementary Metal Oxide Semiconductor (CMOS). The imaging apparatus may be an independent imaging device of a digital camera, and may also be an imaging module integrated to a mobile electronic device such as a mobile phone. In some embodiments, the imaging apparatus is provided with the above-described optical imaging lens assembly.

The above description is only description about some embodiments of the disclosure and adopted technical principles. Those skilled in the art should know that the scope of present disclosure involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the disclosure.

What is claimed is:
1. An optical imaging lens assembly, comprising a first lens, a second lens, a third lens, a fourth lens, a fifth lens, a sixth lens and a seventh lens which are provided in sequence from an object side to an image side along an optical axis, wherein the first lens has a refractive power;

the second lens has a refractive power, wherein, an object-side surface of the second lens is a convex surface, and an image-side surface of the second surface is a concave surface;

the third lens has a refractive power;

the fourth lens has a refractive power;

the fifth lens has a refractive power;

the sixth lens has a positive refractive power, an object-side surface of the sixth lens is a convex surface, and an image-side surface of the sixth lens is a convex surface; and the seventh lens has a negative refractive power, an object-side surface of the seventh lens is a concave surface, and an image-side surface of the seventh lens is a concave surface, wherein a distance FFL on the optical axis between the image-side surface of the seventh lens and an imaging surface of the optical imaging lens assembly, and an axial distance TTL between an object-side surface of the first lens and the imaging surface satisfy FFL/TTL>0.3; a total effective focal length f of the optical imaging lens assembly satisfies 14.8 mm<f<17.3 mm.

2. The optical imaging lens assembly as claimed in claim 1, wherein an effective focal length f6 of the sixth lens, a radius of curvature R11 of the object-side surface of the sixth lens and a radius of curvature R12 of the image-side surface of the sixth lens satisfy 5.5<f6/(R11+R12)<7.4.

3. The optical imaging lens assembly as claimed in claim 1, wherein an effective focal length f7 of the seventh lens, a radius of curvature R13 of the object-side surface of the seventh lens and a radius of curvature R14 of the image-side surface of the seventh lens satisfy −1.7<f7/(R13+R14)<−1.2.

4. The optical imaging lens assembly as claimed in claim 1, wherein the total effective focal length f of the optical imaging lens assembly, an effective focal length f1 of the first lens and an effective focal length f2 of the second lens satisfy 0.4<f/(f1−f2)<0.6; or, a maximum field of view (FOV) of the optical imaging lens assembly satisfies 66°<FOV<76°.

5. The optical imaging lens assembly as claimed in claim 1, wherein a radius of curvature R3 of the object-side surface of the second lens and a radius of curvature R4 of the image-side surface of the second lens satisfy 0.5<R4/R3<0.8; or, a spacing distance T23 on the optical axis between the second lens and the third lens, a central thickness CT3 of the third lens on the optical axis and a spacing distance T34 on the optical axis between the third lens and the fourth lens satisfy 0.6<(T23+CT3)/T34<1.1.

6. The optical imaging lens assembly as claimed in claim 1, wherein a synthetic focal length f123 for the first lens, the second lens and the third lens and a synthetic focal length f4567 for the fourth lens, the fifth lens, the sixth lens and the seven lens satisfy 0.1<f123/f4567<0.9.

7. The optical imaging lens assembly as claimed in claim 1, wherein an axial distance SAG21 from an intersection between the object-side surface of the second lens and the optical axis to an effective radius vertex of the object-side surface of the second lens, an axial distance SAG22 from an intersection between the image-side surface of the second lens and the optical axis to an effective radius vertex of the image-side surface of the second lens and a central thickness CT2 of the second lens on the optical axis satisfy 1.8<(SAG21+SAG22)/CT2<3.8.

8. The optical imaging lens assembly as claimed in claim 1, wherein an axial distance SAG61 from an intersection between the object-side surface of the sixth lens and the optical axis to an effective radius vertex of the object-side surface of the sixth lens, an axial distance SAG62 from an intersection between the image-side surface of the sixth lens and the optical axis to an effective radius vertex of the image-side surface of the sixth lens, an axial distance SAG51 from an intersection between an object-side surface of the fifth lens and the optical axis to an effective radius vertex of the object-side surface of the fifth lens, and an axial distance SAG52 from an intersection between an image-side surface of the fifth lens and the optical axis to an effective radius vertex of the image-side surface of the fifth lens satisfy 0.2<(SAG61+SAG62)/(SAG51+SAG52)<0.7.

9. The optical imaging lens assembly as claimed in claim 1, wherein a distance FFL on the optical axis between the image-side surface of the seventh lens and the imaging surface, and a distance TTL between the object-side surface of the first lens and the imaging surface satisfy 0.4<FFL/TTL<0.6.

10. An optical imaging lens assembly, comprising a first lens, a second lens, a third lens, a fourth lens, a fifth lens, a sixth lens and a seventh lens which are provided in sequence from an object side to an image side along an optical axis, wherein, the first lens has a refractive power;

the second lens has a refractive power, and an object-side surface of the second lens is a convex surface, and an image-side surface of the second lens is a concave surface;

the third lens has a refractive power;

the fourth lens has a refractive power;

the fifth lens has a refractive power;

the sixth lens has a positive refractive power, and an object-side surface of the sixth lens is a convex surface, and an image-side surface of the sixth lens is a convex surface; and the seventh lens has a negative refractive power, and an object-side surface of the seventh lens is a concave surface, and an image-side surface of the seventh lens is a concave surface, wherein a synthetic focal length f123 for the first lens, the second lens and the third lens and a synthetic focal length f4567 for the fourth lens, the fifth lens, the sixth lens and the seven lens satisfy 0.1<f123/f4567<0.9.

11. The optical imaging lens assembly as claimed in claim 10, wherein a total effective focal length f of the optical imaging lens assembly satisfies 14.8 mm<f<17.3 mm.

12. The optical imaging lens assembly as claimed in claim 11, wherein a distance FFL on the optical axis between the image-side surface of the seventh lens and an imaging surface of the optical imaging lens assembly, and a distance TTL on the optical axis between an object-side surface of the first lens and the imaging surface satisfy FFL/TTL>0.3.

13. The optical imaging lens assembly as claimed in claim 10, wherein an effective focal length f6 of the sixth lens, a radius of curvature R11 of the object-side surface of the sixth lens and a radius of curvature R12 of the image-side surface of the sixth lens satisfy 5.5<f6/(R11+R12)<7.4.

14. The optical imaging lens assembly as claimed in claim 10, wherein an effective focal length f7 of the seventh lens, a radius of curvature R13 of the object-side surface of the seventh lens and a radius of curvature R14 of the image-side surface of the seventh lens meet −1.7<f7/(R13+R14)<−1.2.

15. The optical imaging lens assembly as claimed in claim 10, wherein a total effective focal length f of the optical imaging lens assembly, an effective focal length f1 of the first lens and an effective focal length f2 of the second lens satisfy 0.4<f/(f1−f2)<0.6; or, a maximum field of view (FOV) of the optical imaging lens assembly satisfies 66°<FOV<76°.

16. The optical imaging lens assembly as claimed in claim 10, wherein a radius of curvature R3 of the object-side surface of the second lens and a radius of curvature R4 of the image-side surface of the second lens satisfy 0.5<R4/R3<0.8; or, wherein a spacing distance T23 on the optical axis between the second lens and the third lens, a central thickness CT3 of the third lens on the optical axis and a spacing distance T34 on the optical axis between the third lens and the fourth lens meet 0.6<(T23+CT3)/T34<1.1.

17. The optical imaging lens assembly as claimed in claim 10, wherein an axial distance SAG21 from an intersection between the object-side surface of the second lens and the optical axis to an effective radius vertex of the object-side surface of the second lens, an axial distance SAG22 from an intersection between the image-side surface of the second lens and the optical axis to an effective radius vertex of the image-side surface of the second lens and a central thickness CT2 of the second lens on the optical axis satisfy 1.8<(SAG21+SAG22)/CT2<3.8.

18. The optical imaging lens assembly as claimed in claim 10, wherein an axial distance SAG61 from an intersection between the object-side surface of the sixth lens and the optical axis to an effective radius vertex of the object-side surface of the sixth lens, an axial distance SAG62 from an intersection between the image-side surface of the sixth lens and the optical axis to an effective radius vertex of the image-side surface of the sixth lens, an axial distance SAG51 from an intersection between an object-side surface of the fifth lens and the optical axis to an effective radius vertex of the object-side surface of the fifth lens, and an axial distance SAG52 from an intersection between an image-side surface of the fifth lens and the optical axis to an effective radius vertex of the image-side surface of the fifth lens satisfy 0.2<(SAG61+SAG62)/(SAG51+SAG52)<0.7.

19. The optical imaging lens assembly as claimed in claim 10, wherein a distance FFL on the optical axis between the image-side surface of the seventh lens and the imaging surface, and a distance TTL between the object-side surface of the first lens and the imaging surface satisfy 0.4<FFL/TTL<0.6.

* * * * *